US011783528B2

(12) United States Patent
Nowicki et al.

(10) Patent No.: US 11,783,528 B2
(45) Date of Patent: Oct. 10, 2023

(54) METHOD AND APPARATUS FOR SUPPORTING AN IMAGE RENDERING USING RAY TRACING

(71) Applicant: HUAWEI TECHNOLOGIES CO., LTD., Shenzhen (CN)

(72) Inventors: Tyler Bryce Nowicki, Mississauga (CA); David William John Pankratz, Toronto (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/557,850

(22) Filed: Dec. 21, 2021

(65) Prior Publication Data

US 2023/0196654 A1 Jun. 22, 2023

(51) Int. Cl.
| | |
|---|---|
| *G06T 15/06* | (2011.01) |
| *G06T 1/60* | (2006.01) |
| *G06T 7/70* | (2017.01) |
| *G06T 1/20* | (2006.01) |

(52) U.S. Cl.
CPC .............. *G06T 15/06* (2013.01); *G06T 1/20* (2013.01); *G06T 1/60* (2013.01); *G06T 7/70* (2017.01); *G06T 2200/04* (2013.01); *G06T 2200/28* (2013.01)

(58) Field of Classification Search
CPC ................................. G06T 15/06; G06T 1/20
See application file for complete search history.

(56) References Cited

U.S. PATENT DOCUMENTS

| | | | |
|---|---|---|---|
| 10,360,720 B1 | 7/2019 | Nevraev et al. | |
| 11,188,315 B1 | 11/2021 | Luo et al. | |
| 11,397,615 B2 | 7/2022 | Nowicki et al. | |
| 2015/0042651 A1 | 2/2015 | Dwyer | |
| 2021/0335031 A1 | 10/2021 | Hamilton | |
| 2022/0244962 A1 | 8/2022 | Eltantawy et al. | |
| 2022/0351457 A1* | 11/2022 | Smith-Lacey | ........ G06T 15/005 |
| 2022/0392146 A1* | 12/2022 | Bruce | ..................... G06T 15/06 |

FOREIGN PATENT DOCUMENTS

CN 109215106 A 1/2019

OTHER PUBLICATIONS

Burgess J. Rtx on—the nvidia turning gpu. IEEE Micro. 2020.
(Continued)

*Primary Examiner* — Samantha (Yuehan) Wang

(57) ABSTRACT

There is provided a method and apparatus for supporting an image rendering using ray tracing. For at least some elements (e.g. pixels), ray tracing results for previously evaluated elements are used to predict ray tracing results for the current element. These previously evaluated elements can be elements which are proximate to the current element. Feasibility testing and prediction can be performed to determine whether a prediction can be made, and the ray hit test and the opaqueness testing can determine whether the prediction is valid. If testing fails, a full ray tracing operation can be performed for the current element. The operations can be implemented using multithreading. Ray tracing patterning and resolution of elements used for prediction purposes can be adjusted based on prior performance.

20 Claims, 16 Drawing Sheets

(56) References Cited

OTHER PUBLICATIONS

Lufei Liu, et. al., Intersection Prediction for Accelerated GPU Ray Tracing, IEEE Micro 2021.

M. Saed, Y. H. Chou, L. Liu, T. Nowicki and T. M. Aarnodt, "Vulkan-Sim: A GPU Architecture Simulator for Ray Tracing," 2022 55th IEEE/ACM International Symposium on Microarchitecture (MICRO), Chicago, IL, USA, 2022, pp. 263-281, doi: 10.1109/MICRO56248.2022.00027.

* cited by examiner

AABB intersection

Triangle intersection

METHOD AND APPARATUS FOR SUPPORTING AN IMAGE RENDERING USING RAY TRACING

CROSS-REFERENCE TO RELATED APPLICATIONS

This is the first application filed for the present disclosure.

FIELD OF THE DISCLOSURE

The present disclosure pertains to graphics processing of three dimensional (3D) scenes, and in particular to a method and apparatus for supporting an image rendering using ray tracing.

BACKGROUND

Ray tracing is a graphic rendering technique that simulates the course of light interacting with elements of a scene to produce other visual effects (e.g. realistic shadow and lighting effects). Such visual effects occur when rays hit or miss objects in the scene. The rays represent paths of light which travels generally along straight-line paths while being subject to reflections and refractions when such paths intersect objects. The primary rays being traced may be deemed to originate at an "eye" or "camera" which receives light rays from the scene. Secondary and subsequent rays may be deemed to result from the primary rays, for example due to reflections or refractions.

A ray tracing routine has recently been standardized in the Khronos® Vulkan® application programming interface (API) extension. Other ray tracing routines are also known. However, performance in the current standardized ray tracing is subject to improvement.

Ray tracing is computationally intensive as there can be many rays to trace, many potential reflections, and many potential colluders (for shadows). Provided for example that many mobile phones have 786,432 pixels (i.e. 1K resolution) and many desktop monitors have 8,294,400 pixels (i.e. 4K resolution), many applications would not be able to render images in real-time. This can significantly degrade user experience, as the number of rays to trace for such high resolutions (in consideration of the device capabilities) requires long computation times. For example, 7,864,320 rays need to be traced in order to render a scene with a mirror and 5 lights (e.g. a common bathroom) on a mobile phone with 786,432 pixels (i.e. a device with 1K resolution). This significantly exceeds the capabilities of many mobile devices, provided that the color of each pixel is computed 30 to 60 times per second using ray tracing. The current ray tracing technology is computationally intensive, possibly more than other image rendering techniques such as rasterization.

Therefore, there is a need for a method and apparatus for supporting an image rendering using ray tracing, that is not subject to one or more limitations of the prior art.

This background information is provided to reveal information believed by the applicant to be of possible relevance to the present disclosure. No admission is necessarily intended, nor should be construed, that any of the preceding information constitutes prior art against the present disclosure.

SUMMARY

An object of embodiments of the present disclosure is to provide a method and apparatus for supporting an image rendering using ray tracing. In accordance with embodiments of the present disclosure, there is provided a method performed by a computing device, which includes a processor and a memory, for supporting an image rendering using ray tracing. According to embodiments, the method includes, for each element belonging to a first set of elements corresponding to locations of an image (e.g. associated with a graphical display device), performing a ray tracing operation. Said ray tracing operation includes determining whether a ray, corresponding to the element, intersects an object defined within a ray tracing environment. The method further includes, for said each element, storing a result of the ray tracing operation to a result set. The result of the ray tracing operation includes whether the ray intersects the object, and the result set indicates elements for which ray tracing information is obtained along with said ray tracing information for said elements. Subsequently, for each further element belonging to a second set of elements corresponding to locations of the image, a determination is made as to whether a feasibility criterion is met. The method may include such a determination. The further element is proximate to an element currently indicated in the result set, and the second set of elements is different from the first set of elements. The feasibility criterion is indicative of whether a result of the ray tracing operation for said further element can be predicted based on ray tracing information currently stored in the result set. The method further includes, subsequently, for said each further element, when the feasibility criterion is met (e.g. in response to the feasibility criterion being met), making a prediction of the result of the ray tracing operation for said further element based on said ray tracing information currently stored in the result set. Said prediction is indicative of whether a further ray, corresponding to the further element, intersects the object or another object in the ray tracing environment.

In some embodiments, the method further includes, for said each further element, when the feasibility criterion is not met (e.g. in response to the feasibility criterion not being met), performing the ray tracing operation for the further element and storing an indication of the further element in the result set along with results of the ray tracing operation for the further element.

In some embodiments, the method further includes, when the feasibility criterion is met, storing said indication of the further element in the result set along with said prediction. Said prediction is stored as results of the ray tracing operation for the further element. When the prediction indicates the further ray intersects the object or the other object, said testing includes computing the intersection of the further ray and the object or the other object. In some cases, some or all of: said storing the result of the ray tracing operation; said storing the indication of the further element in the result set along with results of the ray tracing operation for the further element; and said storing the indication of the further element in the result set along with said prediction includes storing data in one or more computer registers.

In some embodiments, the method further includes in response to a determination that the prediction is accurate, storing said indication of the further element in the result set along with said prediction; and in response to a determination that the prediction has failed, performing the ray tracing operation for the further element and storing said indication of the further element in the result set along with results of the ray tracing operation for the further element. When said testing determines that the prediction is accurate (e.g. in response to a determination that the prediction is accurate), said prediction is stored as results of the ray tracing operation for the further element. The method may further include, when the feasibility criterion is met, subsequently testing the prediction to determine accuracy thereof.

In some embodiments, the method further includes when the ray intersects the object, storing a location, in the ray tracing environment, where the ray intersects the object. The method further includes when the further ray intersects the object or the other object or when the prediction indicates that the further ray intersects the object or the other object, storing a further location, in the ray tracing environment, where the further ray intersects the object or the other object. The location where the ray intersects the object and the further location where the further ray intersects the object or the other object are stored in the result set, respectively.

In some embodiments, when the further ray does not intersect any object defined within the ray tracing environment, or when the prediction indicates that the further ray does not intersect any object defined within the ray tracing environment, the method further includes storing, in the result set, an indication that the further ray does not intersect any object in the ray tracing environment. When the ray does not intersect any object defined within the ray tracing environment, the result of the ray tracing operation indicates that ray does not intersect any object defined within the ray tracing environment.

In some embodiments, storing the result of the ray tracing operation further includes storing a reference to the object. In some embodiments, said further element is proximate to said element currently indicated in the result set in that said further element neighbors said element currently indicated in the result set. In some embodiments, the feasibility criterion is evaluated based on stored results, in the result set, for elements which neighbor the further element in the image, or the prediction is based on said stored results, in the result set, for elements which neighbor the further element in the image, or both.

In some embodiments, the method further includes performing the method multiple times and adjusting the first set of elements, the second set of elements, or both based at least partially on prior performance of the method. Said performance may be determined based on one or more of: the number of the predictions determined to be accurate, the number of the first set of elements, and the number of the second set of elements. The first set of elements may be adjusted to form a pattern corresponding to a space-filling curve at a particular resolution which is based at least partially on said prior performance of the method. In some embodiments where the first set of elements is adjusted to form a pattern, the method may further include adjusting the resolution of elements in the method based at least partially on said prior performance of the method. In this case, the resolution of elements corresponds to the number of elements, or a size of elements, from which the first set of elements and the second set of elements are selected, and said prior performance of the method is determined based at least partially on said space-filling curve.

In some embodiments, the method further includes selecting the first set of elements to form one of: a spaced-apart configuration in which a majority of pairs of elements are non-adjacent; a checkerboard pattern; a regular or irregular grid pattern of squares, hexagons or triangles; and a pattern corresponding to a subset of locations defined by a space-filling curve.

In some embodiments, determining whether the feasibility criterion is met includes determining availability of results, in the result set, corresponding to the ray tracing operations for one or more other elements neighboring the further element, and determining whether each ray associated with the one or more other elements and the further ray intersect the same object in the ray tracing environment. In addition, making the prediction includes predicting that the further ray also intersects said same object in the ray tracing environment. In some cases, testing the prediction may include computing the intersection of the ray and the object, the intersection of the further ray and the object or the other object, or both.

In some embodiments, the method is performed by the computing device using multithreading program execution comprising a plurality of threads and two or more warps. Each warp consists of multiple ones of the threads which execute a same set of program instructions. Also, elements belonging to the first set of elements are processed using threads of a first one of the warps, and elements belonging to the second set of elements are processed using threads of a second one of the warps. In some cases, at least some members of the plurality of threads may communicate the ray tracing information to at least some other members of the plurality of threads.

In some embodiments, the method is performed by the computing device using multithreading program execution comprising a plurality of threads and one or more warps. Each warp consists of multiple ones of the threads which execute a same set of program instructions. Also, elements belonging to the first set of elements are processed using a first set of threads of one of the warps, and elements belonging to the second set of elements are processed using a second set of threads of said one of the warps. In some cases, at least some members of the plurality of threads may communicate the ray tracing information to at least some other members of the plurality of threads. In some cases, said one of the warps includes threads corresponding to a subset of the elements which are contiguous in the image.

In accordance with embodiments of the present disclosure, there is provided another method performed by a computing device, which includes a processor and a memory, for supporting an image rendering using ray tracing. According to embodiments, for each element belonging to a set of elements corresponding to locations of an image, a determination is made as to whether a feasibility criterion is met. The method may include making such a determination. The feasibility criterion is indicative of whether a result of the ray tracing operation for said element can be predicted based on ray tracing information currently stored in a result set. The result set indicates elements for which ray tracing information is obtained along with said ray tracing information for said elements. The method further includes, when the feasibility criterion is met (e.g. in response to the feasibility criterion being met), making a prediction of the result of the ray tracing operation for said element based on said ray tracing information currently stored in the result set. Said prediction is indicative of whether a ray, corresponding to the element, intersects an object defined within the ray tracing environment. Said ray tracing information currently stored in the result set includes one or both of: (i) results of one or more full ray tracing operations to one or more previously evaluated elements corresponding to other locations of the image, and (ii) one or more prior iterations of the method. In respect of the results of one or more full ray tracing operations, each full ray tracing operation includes determining whether another ray, corresponding to a respective one of the previously evaluated elements, intersects the object or another object defined within the ray tracing environment. Also, each of said results of one or more full ray tracing operations includes whether the other ray intersects the object or the other object. In some embodiments, the method further includes, when the feasibility criterion is not met (e.g. in response to the feasibility criterion not being met), performing the ray tracing operation for the element and storing an indication of the element in the result set along with results of the ray tracing operation for the element.

In accordance with embodiments of the present disclosure, there is provided a computing device (apparatus) for supporting an image rendering using ray tracing. Each computing device includes a processor and a memory storing thereon machine executable instructions. The machine executable instructions, when executed by the processor cause the computing device to perform actions corresponding to any or all of the steps of the methods and features described above.

In accordance with embodiments of the present disclosure, there is provided a (e.g. non-transitory) computer readable medium comprising instructions, which when executed by a computing apparatus, cause the computing apparatus to carry out a method as described above. In accordance with embodiments of the present disclosure, there is provided a computer program comprising instructions which, when the program is executed by a computer, cause the computer to carry out a method as described above.

A potential advantage in some embodiments is that computational complexity of ray tracing is reduced, when ray tracing predictions are made which are less computationally demanding than full ray tracing operations. Quality of the result is not necessarily reduced, particularly when ray hit testing and opaqueness testing is also implemented.

Embodiments have been described above in conjunctions with aspects of the present disclosure upon which they can be implemented. Those skilled in the art will appreciate that embodiments may be implemented in conjunction with the aspect with which they are described, but may also be implemented with other embodiments of that aspect. When embodiments are mutually exclusive, or are otherwise incompatible with each other, it will be apparent to those skilled in the art. Some embodiments may be described in relation to one aspect, but may also be applicable to other aspects, as will be apparent to those of skill in the art.

BRIEF DESCRIPTION OF THE FIGURES

Further features and advantages of the present disclosure will become apparent from the following detailed description, taken in combination with the appended drawings, in which.

It will be noted that throughout the appended drawings, like features are identified by like reference numerals.

DETAILED DESCRIPTION

Embodiments of the present disclosure provide a method and apparatus for supporting an image rendering using ray tracing. Specifically, it is an object of embodiments of the present disclosure to mitigate the redundant ray tracing that occurs for neighboring (physically proximate) elements in a ray tracing environment. This may improve image rendering performance for example in terms of power consumption, time spent, and number of logical operations performed.

The mitigating redundancy in ray tracing (MRRT) process presented herein potentially reduces the amount of traversal and intersection testing (T&I) required for rendering a scene. In various embodiments, for an element under evaluation the MRRT uses the T&I testing results already computed for a set of neighbor elements to predict ray hits. According to embodiments, the ray hit prediction is evaluated by performing a ray hit test and an opaqueness test to determine correctness. If either test fails, another approach is taken, for example the ray may be fully traced. According to embodiments, the ray hit prediction is considered to not miss any important details. If the ray hit prediction misses a small scene feature (e.g. particle) lying between the neighbor elements, the impact of the missing scene feature can be mitigated with ray tracing pipeline extensions (e.g. Vulkan® API extension). It should be understood that, although Vulkan® ray tracing is used herein as an illustrative example of ray tracing, embodiments of the present disclosure are also applicable to other ray tracing implementations.

The MRRT process presented in the present disclosure can be supported by at least certain hardware such as a graphical processing unit (GPU). Various embodiments implementing the MRRT process can improve performance of image rendering and save power in ray tracing applications. This can be useful for example when performing ray tracing in computationally or power limited devices such as mobile, handheld electronic devices. The MRRT can be used in place of or in conjunction with other image rendering techniques such as super samples/resolution, spatial & temporal denoising or the Vulkan® variable rate shading (VRS), as the MRRT is generally compatible with said techniques. The MRRT can be integrated into or applied to exiting or future ray tracing applications. The MRRT can be also used to improve work balancing in a processor such as a GPU.

Figure 1:
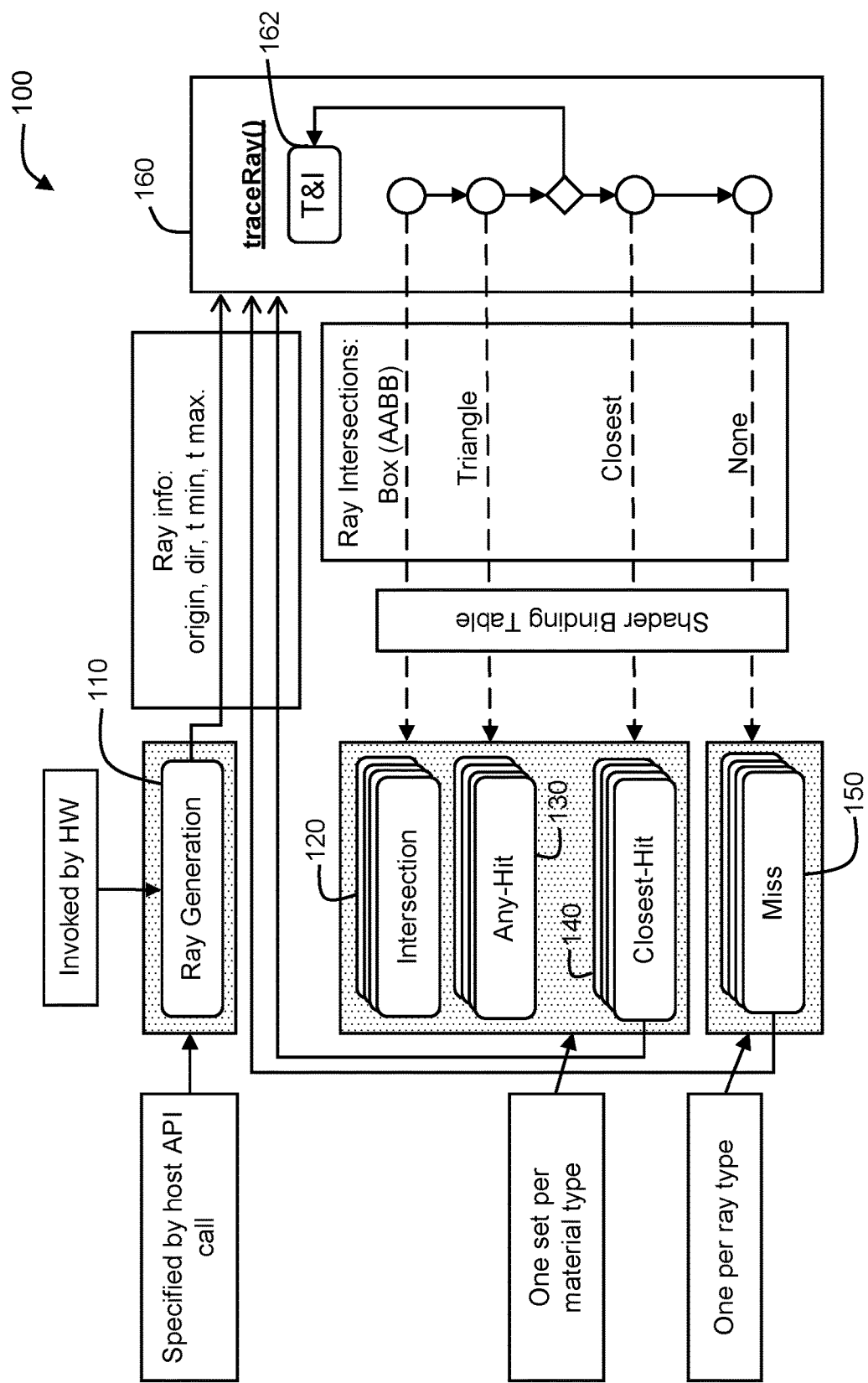
FIG. 1 illustrates a simplified standard unmodified Vulkan® ray tracing pipeline, according to the prior art.

FIG. 1 illustrates a simplified standard unmodified Vulkan® ray tracing pipeline. Referring to FIG. 1, the ray tracing pipeline 100 includes the Ray Generation stage 110, the Intersection stage 120, the Any-Hit stage 130, the Closest-Hit stage 140, and the Miss stage 150. Some or all of these stages may be provided for using user-defined program or shaders. Programmable shaders are responsible for generating rays and calling traceRay( ) method 160. As used herein, a method, when performed by an apparatus, can also be referred to as a function or procedure. The programmable shaders can be written in OpenGl Shading Language (GLSL), for example.

Ray-triangle and ray-AABB intersections generate a set of built-in values, and the programmable shaders use built-in values (e.g. intersection information) to react to each intersection. The built-in values may include gl_PrimitiveID, gl_HitTEXT and Barycentrics. "gl_PrimitiveID" is an identifier of the intersected triangle or axis-aligned bounding box (AABB) and used to access material properties. "gl_HitTEXT" is indicative of the distance to the intersection point on the ray. "Barycentrics" refers to coordinates of the intersection point on the triangle (an article in the ray tracing environment) which is hit by a ray. The barycentrics information is not applicable (NA) in the case of AABB. In the current Vulkan® ray tracing pipeline, ray property and object specific variables do not vary between rays, for example in the case of gl_InstanceID.

The Ray Generation stage 110 may be specified by a host application programming interface (API) calls and invoked by hardware. In the Ray Generation stage 110, the Ray Generation shader computes the ray information, such as origin, direction, minimum distance, maximum distance, etc., and invokes the traceRay( ) method 160. The Ray Generation shader may trace multiple rays (i.e. multiple rays may be traced in the Ray Generation stage 110). While FIG. 1 provides the overall behavior of the traceRay( ) method 160, the precise implementation is not specified as it can be changed. Indeed, in the practice, there are several different ways to implement traceRay( ) method 160.

It is considered that the traceRay( ) method 160 includes two distinct steps, ray hit determination and ray hit processing. The ray hit determination step is of particular relevance to the present disclosure. In the ray hit determination step, traversal and intersection (T&I) testing 162 is performed to identify a set of candidate ray hits. Whenever the traceRay ( ) method 160 is called, T&I testing is performed to determine locations of intersection (if any) between the ray and objects in the ray tracing environment. The ray tracing shaders may be invoked based on the result of the T&I testing. The Intersection stage 120 and the Any-Hit stage 130 may be specified by the host application and are invoked to determine validity of the ray hit. The Intersection stage 120 is invoked when the ray intersects axis-aligned bounding boxes (AABBs), and the Any-Hit stage 130 is invoked when the ray intersects triangles. The closest of the valid ray hits is the output of the ray hit determination step.

The ray hit processing step invokes either the Closest-Hit stage 140 or the Miss stage 150, which may be specified by the host application. The Closest-Hit stage 140 will be invoked when the ray hit determination step results in a valid ray hit. The Miss stage 150 will be invoked when the ray hit determination step does not result in a valid ray hit. These stages may also recursively invoke the traceRay( ) method 160. There may be one set of stages, including the Intersection stage 120, the Any-Hit stage 130 and the Closest-Hit stage 140, for each material type (e.g. metal, cloth, steel, mirror, other opaque or non-opaque materials). There may be one Miss stage 150 for each ray type (e.g. shadow, reflection, refraction).

Figure 2A:
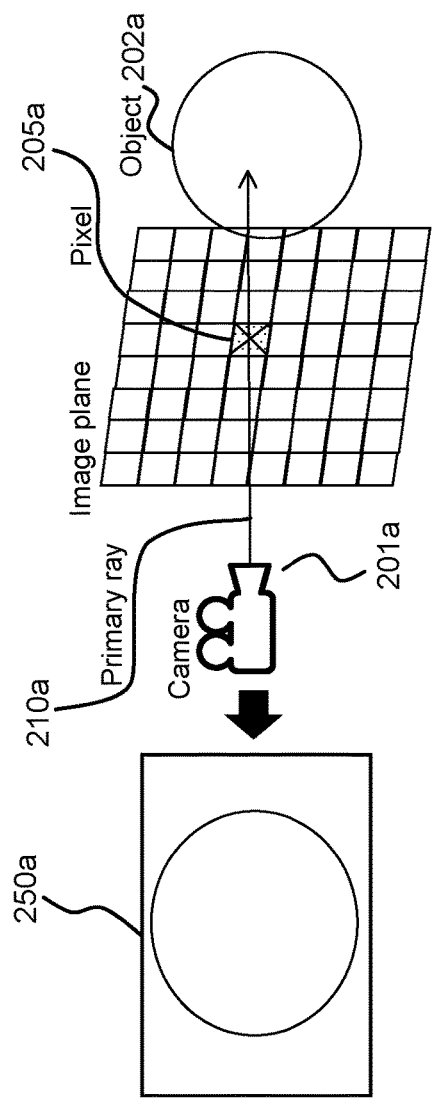
FIG. 2A illustrates an example of ray tracing involving a primary ray, according to the prior art.
Figure 2B:
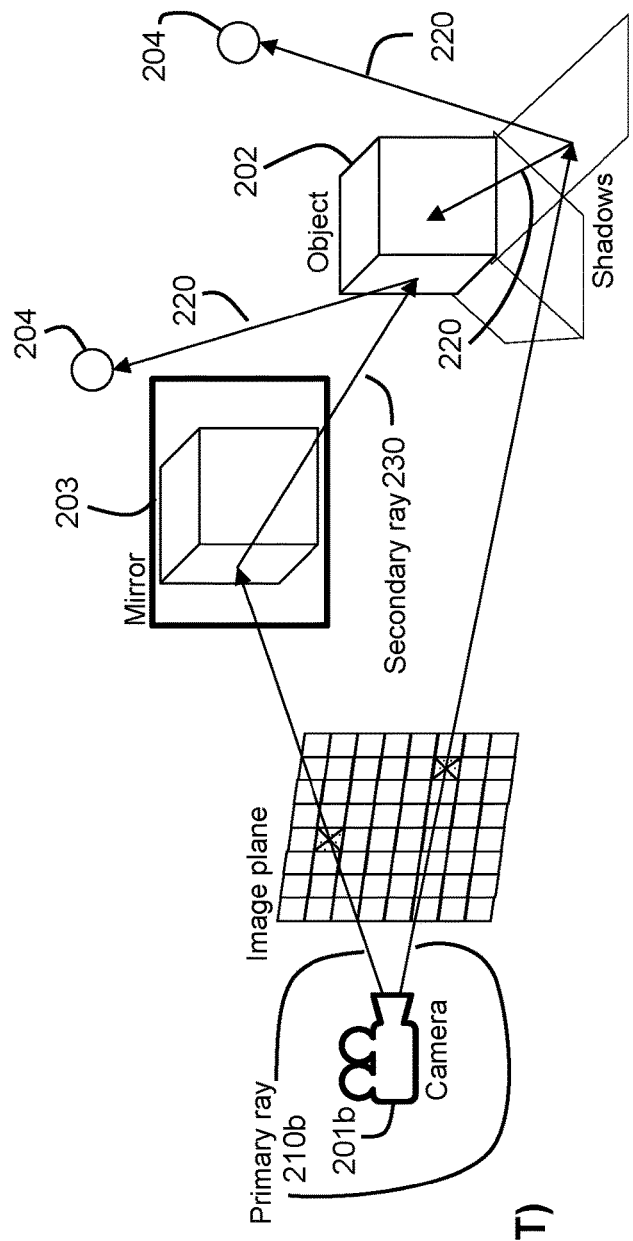
FIG. 2B illustrates an example of ray tracing involving multiple rays, according to the prior art.

In order to render the scene using ray tracing each element (e.g. pixel), corresponding to locations in an image such as a two-dimensional or three-dimensional image, is visited and rays are traced, as illustrated in FIGS. 2A and 2B. The elements can correspond to locations on a graphical display.

FIG. 2A illustrates rendering of a scene using a ray tracing technique applied to primary rays (i.e. rays passing through an element such as a pixel or group of pixels). At the scene illustrated in FIG. 2A, the primary ray 210a starts at the camera 201a and is directionally defined as passing from the camera through the pixel 205a. The primary ray 210a ends at the closest object hit, at the location where the primary ray hits object 202a. The pixel 205a may then be colored with the color of the object 202a. Tracing only the primary ray 210a to the object 202a, the corresponding portion of the image 250a is rendered without effect of shadow or other light sources. To render the full image 250a as a 4K image, at least 8,294,400 (3840×2160) primary rays need to be traced, and further rays also typically are traced, as discussed below.

FIG. 2B illustrates rendering a scene using a ray tracing technique involving multiple types of rays. In FIG. 2B, there are multiple types of rays including the primary ray 210b, the shadow rays 220 and the reflection rays 230. The primary ray starts at the camera 201b and the shadow rays 220 start at objects in the scene and point to the lights 204. Provided with multiple lights 204, multiple shadow rays 220 may start at the same place and point to different light sources. The reflection rays 230 are traced for rays that reflect off the mirror 203. Many types of secondary rays are not depicted in FIG. 2B including: refraction, caustic, and ambient occlusion rays. To render a 4K image for the scene illustrated in FIG. 2B, tens or hundreds of millions of rays may need to be traced. For instance, if there are N lights and M secondary rays, 8,294,400×N×(M+1) rays need to be traced per frame. It may be noted that the quality of the rendered image is highly dependent on the number of rays being traced.

Ray tracing operations are typically executed over a grid possibly containing hundreds, thousands, or more elements. For example, the elements may be pixels of an image or graphical display and the grid may be the image plane of pixels. The elements may alternatively be groups of pixels or other regions of an image or graphical display. For each element, traceRay( ) (e.g. traceRay( ) method 160 in FIG. 1) is invoked one or more times, and traceRay( ) performs T&I.

Figure 3:
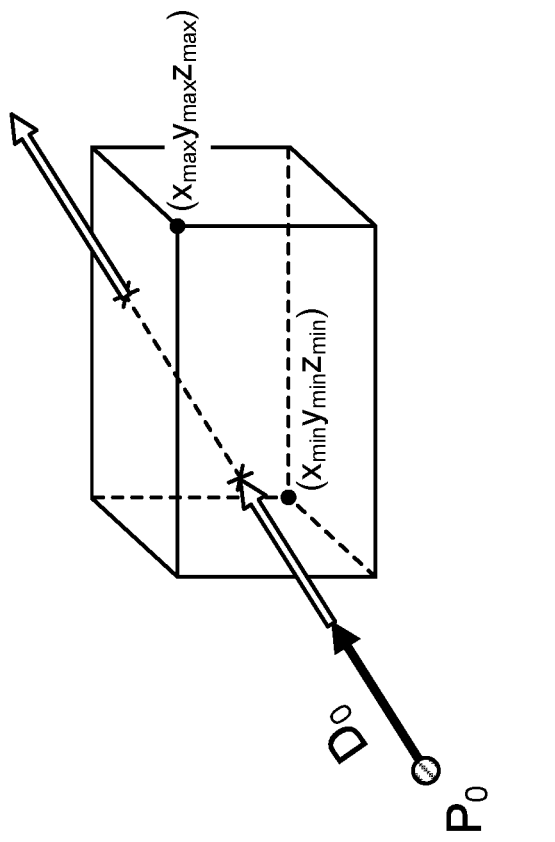
FIG. 3 illustrates examples of a ray tracing triangle intersection and axis-aligned bounding box (AABB) intersection, respectively, according to the prior art.
Figure 3:
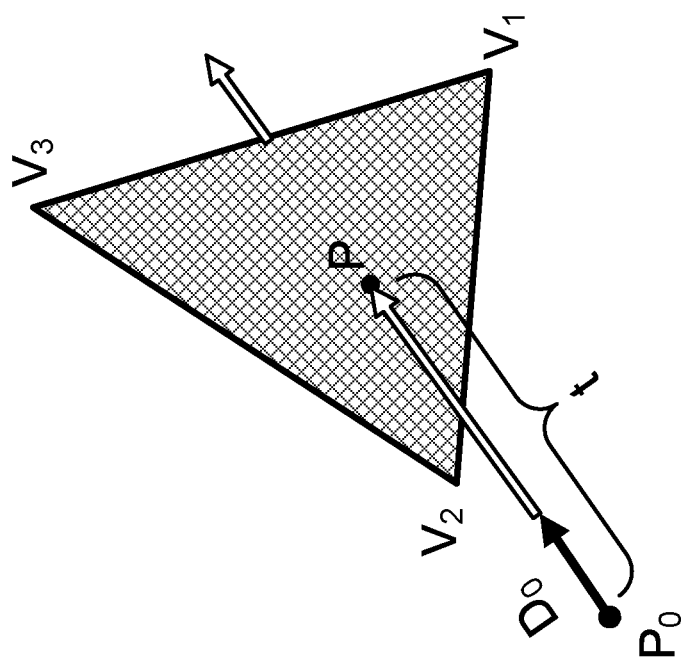

In ray tracing, hundreds. thousands, or more rays can intersect triangles or axis-aligned bounding boxes (AABBs). A significant number of rays can hit the same triangle or portion of an AABB. Examples of a triangle intersection and axis-aligned bounding box (AABB) intersection are illustrated in FIG. 3, respectively. Referring to the example of triangle intersection in FIG. 3, $P_0$ represents the ray origin and $D_0$ represents the ray direction. The distance between the ray origin $P_0$ and the intersection point in the triangle is the intersection distance t, where $V_1$, $V_2$ and $V_3$ represent vertices of the intersecting triangle. Referring to the example of AABB intersection in FIG. 3, $P_0$ represents the ray origin and $D_0$ represents the ray direction. ($X_{min}$, $Y_{min}$ and $Z_{min}$) and ($X_{max}$, $Y_{max}$ and $Z_{max}$) represent defining coordinates of the intersecting axis-aligned bounding box. While not illustrated in FIG. 3, AABBs may contain a procedural shape, such as a sphere or torus. The primitives in the scene (e.g. triangles and AABBs making up a ray tracing environment) are typically tested for intersection with each ray. An acceleration structure may sort the primitives, for example reducing traversal and intersection tests from O(N) to O(log N).

Figure 4A:
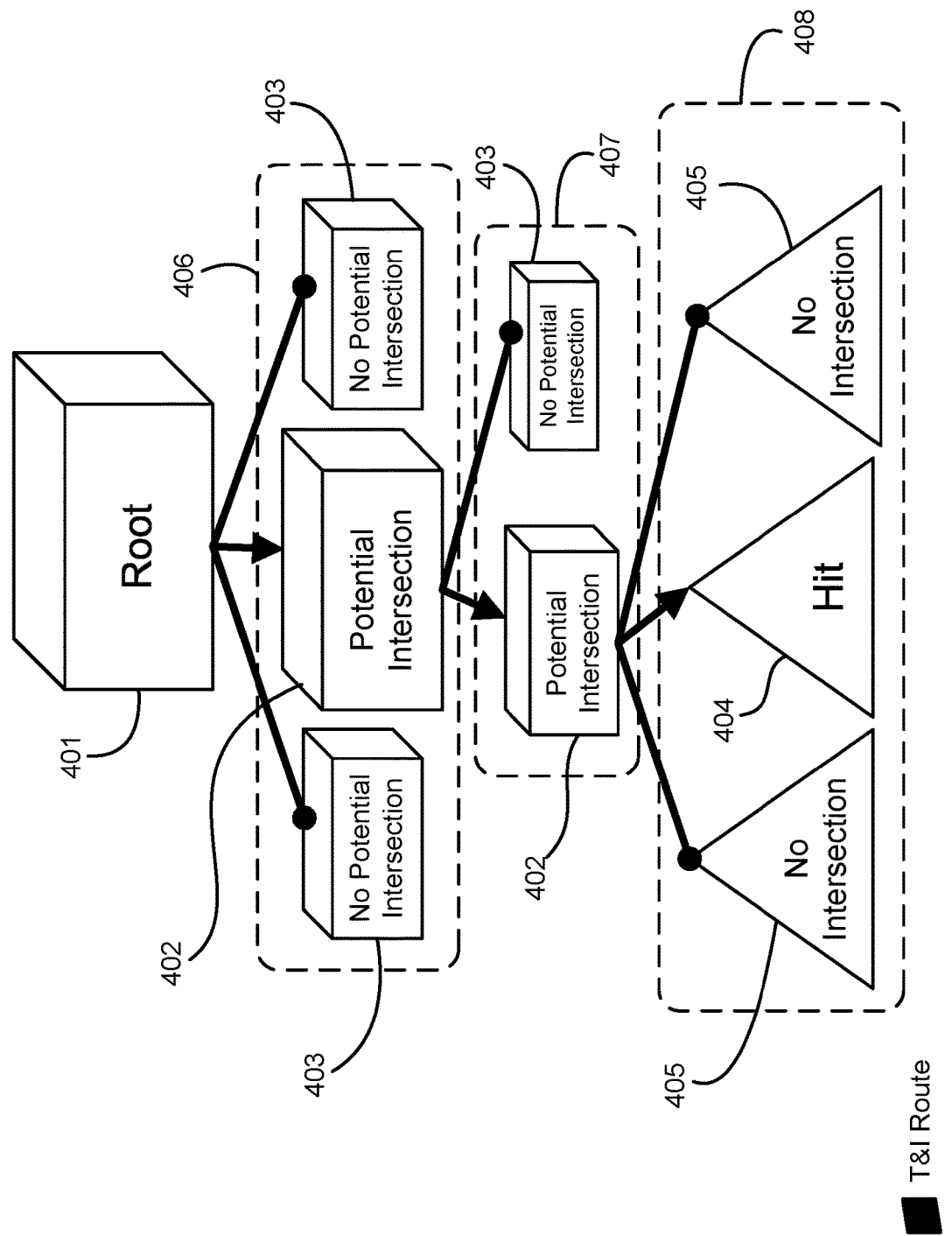
FIG. 4A illustrates a traversal and intersection (T&I) operation performed in accordance with the prior art.

FIG. 4A illustrates an acceleration structure of the traversal and intersection (T&I) operation. In ray tracing, the T&I operation includes a number of intersection and hit operations to determine if the ray hit is valid. For example, as illustrated in FIG. 4A, a ray is traced from its origin or root node 401 and passes through or intersects a number of child nodes that contain a region of space until it eventually hits a geometry object, triangle or AABB, (e.g. the location of the ray hit). Traversal is carried out recursively beginning at the root node 401, at each step the child nodes are processed (e.g. child nodes 406 and 407). If the ray does not pass through the child node 406 or 407, which can be determined by a test defined by the acceleration structure, then an intersection with the contained geometry is not possible (i.e. No potential intersection 403), consequently no further processing is necessary. Otherwise, an intersection is possible (i.e. potential intersection 402), while not guaranteed, so the child node is recursively evaluated. When further evaluating, for example after determining that there is potential intersection 402 at the child node 407, it may be determined that there would be no intersection 405 for the ray, if the child node (e.g. child node 408) does not contain geometry object, triangle or AABB. If the child node (e.g. child node 408) contains geometry object, triangle or AABB, then it can be determined that the ray hits 404 or intersects with the contained geometry object, triangle or AABB, and then the ray is tested for an intersection with each contained object, triangle or AABB. Multiple intersections with the same ray are possible and each must be evaluated with the ray hit determination method to identify the closest hit. As such, traversal and intersection (T&I) is a potentially computationally intensive recursive operation that must visit the child nodes for each potential intersection found. While the actual number of computing operations required for traversal and intersection (T&I) is application-specific and dependent upon the complexity of the scene, in most cases, due to the large number of rays T&I testing is a primary bottleneck and a primary source of cost (e.g. in terms of execution time) in the ray tracing pipeline. In other words, T&I operations represent a significant portion of the computation required in conventional ray tracing.

Figure 4B:
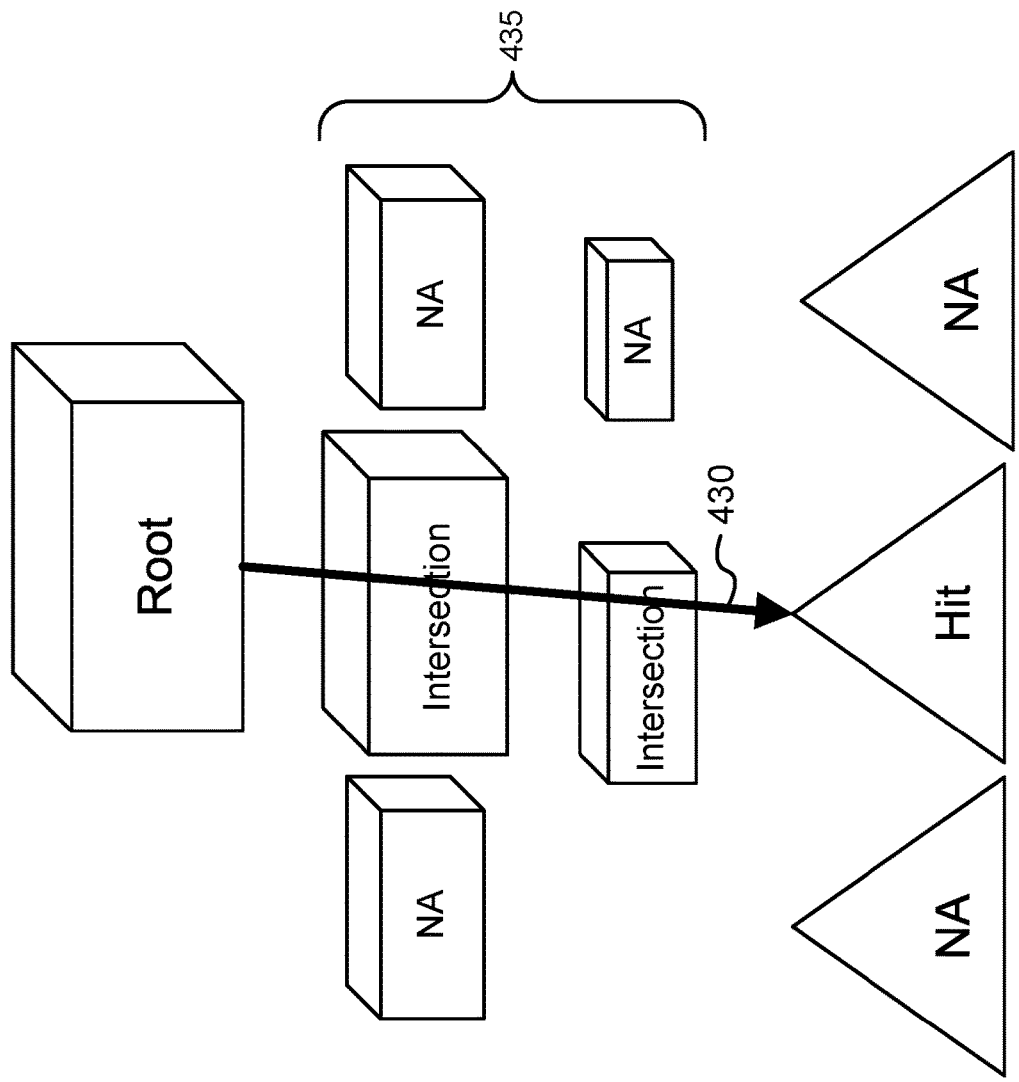
FIG. 4B illustrates an acceleration structure for ray hit prediction which skips at least some T&I operations, in accordance with embodiments of the present disclosure.

In comparison with FIG. 4A, FIG. 4B illustrates an acceleration structure for ray hit prediction which skips traversal and intersection (T&I) testing operation when a prediction 430 can be made, in accordance with embodiments of the present disclosure. The significant computational cost of T&I testing can be reduced by leveraging the similar ray tracing carried out by neighboring elements (e.g. pixels). Specifically, some T&I testing operations 435 can be skipped or eliminated upon prediction of the ray hit, as illustrated in FIG. 4B. Ray hits can be predicted with triangles and AABBs. Ray hits can be successfully predicted most of the time based on an appropriate scheme (e.g. elements in a specific order). In other words, based on other nearby, previously evaluated rays, a prediction 430 can be made for a ray, indicative of whether the ray will hit an object and which object will be hit. Then, the prediction can be tested, at least in some embodiments. The prediction allows the T&I testing process to skip testing for intersection with other objects that would otherwise be carried out in the conventional setup of FIG. 4A.

Upon inspection of rays traced for image rendering in a typical environment, it has been recognized by the inventors that many of the rays are redundantly traced. Specifically, pairs of neighboring elements (e.g. pixels) tend to trace rays that are nearly identical or substantially equivalent to each other. For example, two primary rays that pass through neighboring pixels are likely to hit the same object, the secondary rays beginning at that object are likely to hit the same further object, bounding box, or light source, and so on. These nearly identical rays generally produce the same result with high probability. It may be noted that a term 'element' is used in the present disclosure, instead of 'pixels', as, in practice, there does not necessarily exist a one-to-one mapping between pixels and elements. The relationship between pixels and elements may be determined by the application.

Embodiments of the present disclosure provides a method and apparatus for supporting image rendering using ray tracing. According to embodiments, elements in the image plane are evaluated in a specific order using a "mitigating redundancy in ray tracing" (MRRT) technique. The elements may correspond to locations of a two dimensional (2D) or three dimensional (3D) image displayed by a graphical display device. Said graphical display may be a device that displays a 2D image, a 3D holographic image, or both (e.g. monitor, screen, video display, hologram projector). In various embodiments, a first sparse (e.g. spaced-apart) set of elements are evaluated using ray trace operations, and the result of each ray trace operation is stored to a result set. Then subsequently and in turn, a second set of the elements (e.g. the remaining elements) are evaluated. The first set of elements and the second set of elements may be disjoint sets (i.e. each element is a member of only one set). In various embodiments, at least some elements of the first set of elements are proximate to (neighbors of) at least one element of the second set of elements. In some embodiments, the second set of elements is the set of all elements that remain after selection of the first set of elements, so that the union of the first and second sets of elements makes up all the elements corresponding to all locations of a 2D or 3D image or graphical display.

In order to mitigate or eliminate redundant ray traces, the stored results for the neighbor elements (e.g. stored result for the first sparse set of elements) are retrieved for example from the stored result set. The retrieved results are used to predict the result of the ray trace operation for the second set of the elements (e.g. the remaining elements). This is referred to as a ray hit prediction. To help ensure correctness of the result, the ray hit prediction is validated by ray hit testing and opaqueness testing. In various embodiments, if the test is failed, the ray(s) for that element are fully traced. Otherwise, if the test is passed, indicating that the prediction is likely correct, the ray hit prediction is used without requiring full ray tracing.

Figure 5:
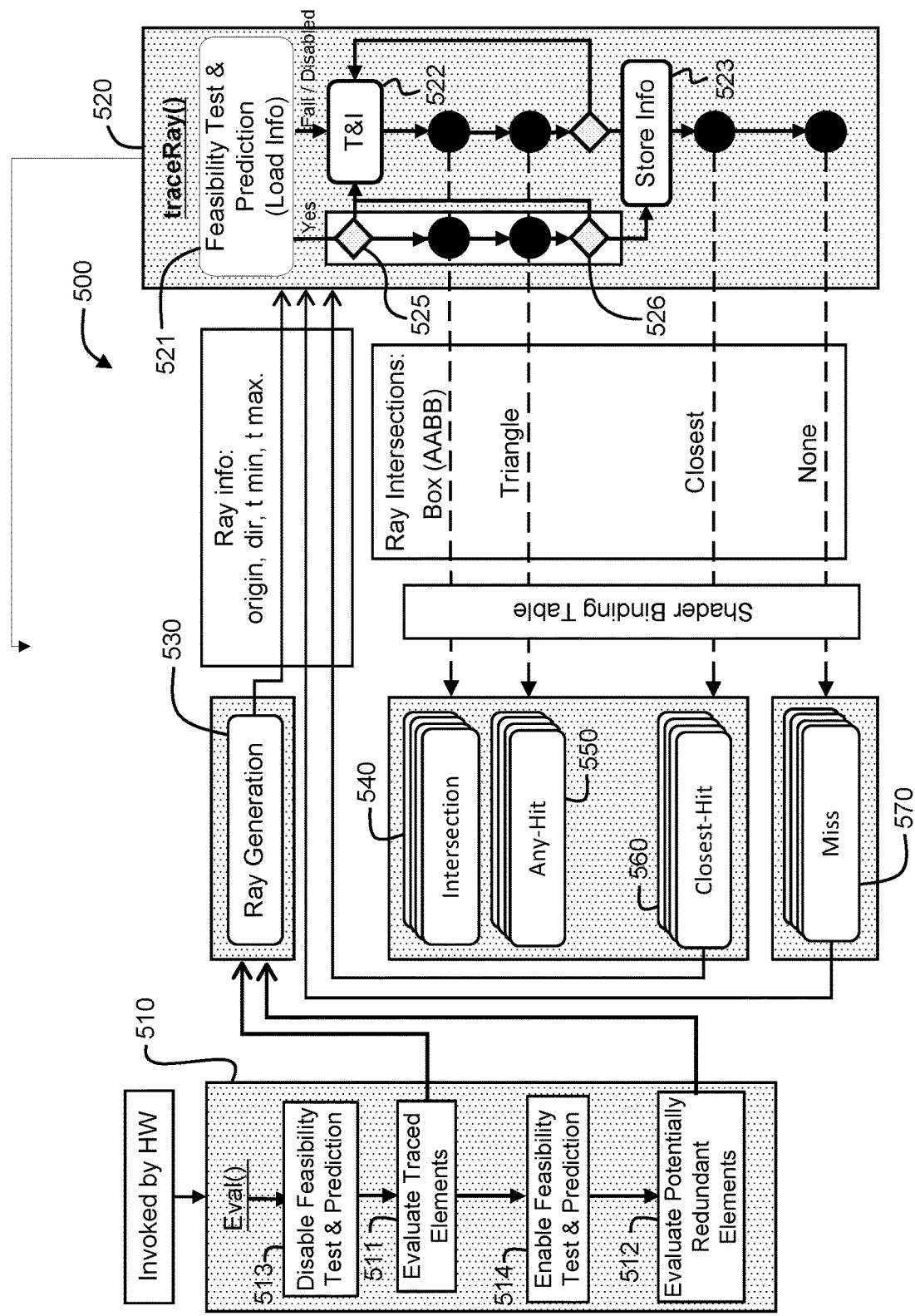
FIG. 5 illustrates a process for mitigating redundancy in ray tracing (MRRT) in a ray tracing pipeline, in accordance with embodiments of the present disclosure.

FIG. 5 illustrates a process of mitigating redundancy in ray tracing (MRRT) integrated in the Vulkan® ray tracing pipeline 500, in accordance with embodiments of the present disclosure. As mentioned above, although the process MRRT is illustrated with respect to the Vulkan® ray tracing pipeline, it can be used similarly with other types of ray tracing procedures.

Briefly, the illustrated process involves performing conventional ray tracing for a first set of elements and storing the results, and then subsequently and in turn performing ray tracing augmented with the feasibility test & prediction operation 521 enabled for a second set of elements, with the predictions being based at least in part on the stored results. The results of the conventional ray tracing may be stored to a result set (e.g. a result set indicating elements for which ray tracing information is obtained along with said ray tracing information for said elements). The augmented ray tracing is performed for each of a second set of elements at a time (i.e. one at a time). In various embodiments the stored results or the stored result set can be updated with results of the ray tracing performed on the second set of elements. For example, after the augmented ray tracing procedure is performed for each element from the second set, the result can be stored to a result set and used as a basis for prediction for subsequent elements from the second set.

In an alternative, conventional ray tracing for a first set of elements is not necessarily performed as an explicit separate operation. For example, the feasibility test and prediction may be enabled at the beginning of ray tracing, but a prediction can be quickly determined to be infeasible because there are not yet a sufficient number of stored results to perform prediction. As ray tracing for more and more elements is performed, the feasible test and prediction may be more likely to determine that a prediction for an element is feasible, and predictions can be made more often as more and more elements are evaluated. Such an approach may be implemented and evaluated to determine if it provides a computational advantage over other approaches.

In the Vulkan® Ray Tracing pipeline, a significant proportion of the computations in the ray trace operation may be dedicated to traversal and intersection (T&I) testing. Although T&I testing is only one part of the Vulkan® Ray Tracing pipeline, the cost (e.g. execution time or number of operations) of T&I testing contributes significantly to the total cost (e.g. total execution time or number of operations) of the pipeline. Therefore, by skipping T&I testing or at least some of T&I testing, at least some of the time, embodiments of the present disclosure may significantly reduce the cost of the pipeline operations while limiting changes to behavior of the pipeline.

Referring to FIG. 5, the process of MRRT is illustrated as follows. The evaluation method (i.e. eval( )) 510 can be invoked by hardware (HW, e.g. GPU, processing unit, computing devices). The eval( ) method 510 includes steps 511 and 512, and the process of disabling 513 and enabling 514 the feasibility test & prediction 521. Specifically, prior to step 511, the feasibility test & prediction 521, which is performed within the traceRay( ) function 520, is disabled 513.

In step 511, a first set of neighbor elements is selected and evaluated by invoking the first stage of the Vulkan® ray tracing pipeline, the Ray Generation stage 530. The selected neighbor elements may be a sparse set of elements or sparse elements. The Ray Generation stage 530 is part of the Vulkan® standard and essentially equivalent to the Ray Generation stage 110 illustrated in FIG. 1. The Ray Generation stage 530 invokes the traceRay( ) method 520, which is provided by the Vulkan® implementation (e.g. the hardware vendor), one or more times during the MRRT process. Whenever invoked, the traceRay( ) method 520 coordinates the execution of the other stages in the ray tracing pipeline (e.g. Intersection stage 540, Any-Hit stage 550, Closest-Hit stage 560, the Miss stage 570), as illustrated in FIG. 5.

When the feasibility test & prediction 521 is disabled in step 513 during evaluation of elements in step 511, the T&I testing 522 is performed as part of method 520 to determine whether (and where) a ray intersects (or hits) an object defined within a ray tracing environment. The ray may correspond to each element of the first (sparse) set of elements selected in step 511. It may be noted that the origin of the ray does not necessarily match the location of the element in the ray tracing environment.

Upon determination of the ray hit, a result of the ray trace operation is stored 523 in memory (e.g. computer register or other nearby memory). A computer register may be a data storage device which is dedicated for holding data to be processed by the processor. It may be accessible at high speed by the processor, for example directly accessible by the processor. In some embodiments the processor may directly manipulate data stored in a computer register. In various embodiments, the information stored in memory (the trace operation result to be stored in memory) can be used to predict the result of an element's ray trace operation. For example, the result of ray trace operation for elements from the second set may be predicted using the stored results of the ray trace operation for elements from the first set (e.g. the first sparse set of elements selected in step 511). More particularly, for an element in the second set, ray tracing results for previously evaluated elements (in the first set, the second set, or both) which are proximate to the element in the second set, can be used as a basis for prediction. The previously evaluated elements appear in the result set. The result of the ray trace operation or information related thereto may be stored as a member or part of the result set.

The information or the result set stored in memory may include the indication of whether the ray (currently being evaluated) intersects the object. If the ray intersects the object, the information or the result set stored in memory may further include the location where the ray intersects the object, the information about the object that the ray hits (e.g. reference to the object) or both. It is noted that a 'miss' (i.e. ray does not hit any object) may be the trace operation result and such a result may be stored 523 in memory, for example as part of the result set. While feasibility testing and prediction is disabled, the ray hit determination process occurs whenever the traceRay( ) method 520 is called by the Ray Generation stage 530. In some embodiments, if the traceRay( ) method 520 is called multiple times, one or more of the ray information, program counter, sequence of traceRay ( ) 520 calls, will be stored 523 along with the ray tracing result. Accordingly, in some embodiments, when the feasibility test & prediction 521 is disabled, ray tracing proceeds in a substantially conventional manner, but it is noted in particular that certain information is stored in memory for access by future ray tracing operations in which the feasibility test and prediction 521 is enabled. The certain information stored in memory may be saved as part of the result set.

After step 511 and prior to (or during) step 512, the feasibility test & prediction 521 is enabled 514. Upon enabling 514 feasibility test & prediction 521, in step 512, a second set of elements, corresponding to some or all of the remaining elements after evaluation of the first set of elements, are evaluated by invoking the first stage of the Vulkan® ray tracing pipeline, namely the Ray Generation stage 530. The second set of the elements may be evaluated one after another (i.e. evaluate one element at a time, evaluated in turn). Each of these remaining elements is potentially redundant in the sense that performing ray tracing on a remaining element can output the same evaluation result as the rays associated with a previously evaluated (and typically physically proximate) element. As stated above, the Ray Generation stage 530 is part of the Vulkan® standard and essentially equivalent to the Ray Generation stage 110 illustrated in FIG. 1.

The Ray Generation stage 530 invokes the traceRay( ) method 520, which is provided by the Vulkan® implementation (e.g. the hardware vendor). With the feasibility test & prediction 521 enabled 514, whenever the traceRay( ) method 520 is called, the ray trace results of neighboring elements (i.e. elements which are proximate to the element being evaluated and which have been previously evaluated in step 511, or possibly which have been previously evaluated according to step 512) are loaded. Proximity, or qualification of an element as "neighboring" can be evaluated according to one or more criteria which depends on relative locations of elements. If the traceRay( ) method 520 is called multiple times, one or more of the ray information, program counter, sequence of traceRay( ) 520 calls may be used to determine the ray trace result of each neighbor element for each call to traceRay( ) method 520. In some embodiments where the traceRay( ) method 520 is called multiple times, the first set of neighbor elements, the second set of elements currently being evaluated, or both are adjusted or selected based at least partially on performance of one or more prior instances of the traceRay( ) method 520. Each element in one set of elements may be a neighbor element of at least one element in the other set of elements. Each selected set of elements may be a sparse set of elements.

Further in some embodiments where the traceRay( ) method 520 is called multiple times, the resolution may be adjusted based at least partially on performance of one or more prior instances of the traceRay( ) method 520. The resolution of elements corresponds to the number of elements, spacing of elements, number of elements, or combination thereof, from which the first set of neighbor elements (e.g. a sparse set of elements selected in step 511) and the second set of elements being evaluated (e.g. remaining elements or part of the remaining elements) are selected. The number of elements may be indicated by the number of pixels or a physical measurement unit.

Regarding the performance of one or more prior instances of the traceRay( ) method 520, the performance may be evaluated based on the prediction success rate (e.g. the number of successful predictions divided by the total number of elements). It should be noted that the highest prediction success rate can be obtained when the size of the second set of elements (i.e. the number of elements in the second set) being evaluated (e.g. remaining elements or part of the remaining elements) is optimal, and therefore identifying the optimal size of the second set is important. If the size of the second set is too large, the likelihood that the feasibility test & prediction 521 succeeds is typically low. Although the large size entails high or even maximum potential success rate, the actual prediction success may be significantly lower than what can be achieved. On the other hand, if the size of the second set is too small, the maximum potential success rate would be smaller than what can be potentially achieved. Although the likelihood of the feasibility test & prediction 521 succeeds will be high, the actual success rate will not be high as the potential success rate is low. An optimization can be performed in order to increase (e.g. with the goal of maximizing) the total number of successful predictions, by adjusting the sizes of the first and second sets, and possibly also by configuring spatial patterns made by the first and second sets. It is observed that the first and second sets are selected from the same total number of elements, so that a larger first (second) set results in a smaller second (first) set. A larger first set will generally lead to a higher probability of successful predictions for elements of the second set, but a lower total number of prediction opportunities. A larger second set will generally lead to a higher total number of prediction opportunities, but, due to the consequently smaller first set, each prediction opportunity has a lower probability of success.

The feasibility test & prediction 521 generally operates to predict the result of a ray tracing operation, performed on a given element (e.g. one element of the second set of elements), without necessarily performing the full T&I procedure for that element. Accordingly, an attempt is made to predict the ray tracing result for the given element (e.g. one element of the second set of elements), based on prior ray tracing results for other elements proximate to the given element (e.g. prior ray tracing results or ray tracing information that are currently stored in the result set for neighboring elements). In other words, the prediction provides an object (potentially a set of primitives) that is likely (with some probability) to intersect the ray. This prediction can be verified (ray hit test 525 and opaqueness test 526) by computing the intersection between the ray and that specific set of primitives (e.g. ray hit test 525). In the simplest case, this intersection computation can involve a ray-triangle intersection test. Re-computing the ray-triangle intersection gives the barycentrics values (i.e. hit location) required for the downstream shaders. It should be noted that the ray-triangle intersection test is only performed for non-AABB primitives. The ray-triangle intersection test does not need to be performed for AABB primitives, as the barycentrics values are not applicable to the AABB intersections. In addition to the intersection computation (e.g. ray hit test 525), the prediction can be also verified evaluating the opaqueness of the computed ray-hits using the any-hit and intersection shaders associated with the geometry. For example, when rendering a leaf (e.g. a maple leaf), there is a rectangular object including a leaf (i.e. opaque part) and background (i.e. completely transparent part). Put another way, the object rectangle is transparent except where the opaque leaf is positioned. When processing a ray hit, after the ray hit is confirmed, the opaqueness test (e.g. opaqueness test 526) confirms that the location hit by the ray is opaque, thereby confirming that the ray hits the leaf does not pass through the transparent background part of the rectangular object.

In various embodiments, the user-defined any-hit or intersection shaders (e.g. Intersection stage 540, Any-Hit stage 550) can be invoked to evaluate the prediction (opaqueness test 526). The required steps of the ray tracing pipeline will be invoked, but when and which shaders to invoke would be dependent upon the ray-tracing application.

When error in the ray-tracing result can be tolerated by the application and computational constraints are tight, it is conceivable, and within the scope of embodiments of the disclosure, that a prediction can be made and accepted as valid without further consideration. However, in various embodiments, one or more tests (or checks) are performed in conjunction with the prediction. If one of the tests fails, then a full ray tracing operation, including T&I testing, will typically be performed for the element, rather than using an unreliable prediction. Three particular forms of such tests are a feasibility test & prediction 521, a ray hit test 525 and an opaqueness test 526, as described below.

The feasibility test & prediction 521 determines whether or not the outcome of the T&I operation, for the element currently being evaluated, can be predicted based on the ray tracing results for previously evaluated elements. In order to perform the feasibility test & prediction 521, ray tracing results for a limited number of previously evaluated elements (e.g. ray tracing results stored in the result set), which are proximate to the element currently being evaluated, can be analyzed. The analysis can include checking whether a sufficient number of such results are available. The analysis can include whether a sufficient number of such (available) results agree in the sense that the same object is hit by a sufficiently large number of rays corresponding to previously evaluated, proximate elements. The output of the feasibility test & prediction 521 indicates whether or not there is enough information to reliably predict a ray hit for the element currently being evaluated. The feasibility test & prediction 521 can involve determining whether an associated feasibility criterion is met. The feasibility criterion indicates whether a ray tracing result can be predicted based on current information in the result set.

In some embodiments, the feasibility test & prediction 521 includes determining whether or not there are a sufficient number of previously evaluated elements, in a sufficiently close pattern, to make a reliable prediction. For example, the feasibility test & prediction 521 can determine whether or not ray tracing results for all (or a majority) of elements which neighbor the currently evaluated element are: (1) available; and (2) have the same outcome (e.g. indicate the same object hit in the same spatial region).

The feasibility test & prediction 521 indicates whether a ray, corresponding to the element currently being evaluated, intersects an object in the ray tracing environment, and if so, the prediction indicates the object (e.g. triangle or set of triangles) intersected by the ray. Prediction can be performed based on some or all of the previous ray tracing results that are evaluated by the feasibility test (e.g. previous ray tracing results currently stored in the result set). For example, suppose all (or a majority of) rays, corresponding to previously evaluated elements which are proximate to (e.g. neighbor) the element currently being evaluated, hit the same object in substantially the same location. Then the prediction for the element currently being evaluated can be that the ray corresponding for this element also hits this same object in substantially this same location. As another example, suppose all (or a majority of) such rays (i.e. corresponding to previously evaluated elements which are proximate to the element currently being evaluated) miss all objects in the ray tracing environment. Then the prediction for the element currently being evaluated can be that the ray corresponding to this element also misses all objects in the ray tracing environment.

In some embodiments, the feasibility test can be performed, for each of the second set of elements at a time, prior to the operation of making the prediction, for example as a separate test. In some embodiments, the feasibility test can be partially or fully merged with the operation of making the prediction. For example, the operation of making the prediction may either result in a prediction or an indication that the prediction cannot be made. When a prediction is made, the feasibility test can be considered to have passed. When the result is the indication that the prediction cannot be made, the feasibility test can be considered to have failed. The feasibility test can thus be considered to be a conditional branch within the prediction operation itself. Whether or not the feasibility test is performed prior to or as part of the prediction is a choice which can be made based on the resulting computational efficiency, and such a choice leads to different corresponding embodiments. In various embodiments, if the feasibility test determines that the ray hit prediction can be made, then the ray hit prediction is performed. Otherwise, the ray hit prediction is not performed and instead full ray tracing, including T&I, is performed for that element.

According to ray hit test 525 and opaqueness test 526, the ray hit prediction, after being made, may be tested to determine if the ray actually hits (intersects) the predicted geometry. The ray hit test 525 and opaqueness test 526 is also performed for each ray-hit determined by T&I testing. Consequently, the ray hit prediction is expected to require less computation and therefore is less computationally intensive than the ray tracing operation (T&I). When the test indicates the ray hit prediction is successful, the prediction is stored as a verified prediction. The prediction may be stored as results of the ray tracing operation. The prediction may be stored in memory (e.g. computer register or other nearby memory). An indication of the predicted element (in the second set of elements) in the result set may be also stored in memory. In some embodiments, the prediction thus stored can be used for the feasibility test, prediction making, or both, for subsequently evaluated elements. In some embodiments, the prediction, the indication of the predicted element, or both can be stored in the result set even if the ray hit test 525 or opaqueness test 526 is not performed. For example, when feasibility test is passed (e.g. a certain feasibility criterion is met) and the ray hit prediction is performed, an indication of the predicted element (from the second set elements) is stored in the result set along with said prediction. This prediction may be stored as a result of the ray tracing operation for said predicted element.

Further referring to FIG. 5, the ray hit test 525 and opaqueness test 526 can proceed efficiently as follows. The feasibility test & prediction 521 provides an indication of a location at which a ray, corresponding to a given element, hits an object. Then, the ray hit test 525 and the opaqueness test 526 are performed in respect of the object. If the object is a triangle, the ray hit test 525 verifies if the ray intersects the triangle or, in some embodiments, a proximate triangle (such as leaf nodes 408 of FIG. 4A in the acceleration structure), and the opaqueness test 526 verifies the opaqueness of the ray-hit with the intersected triangle by evaluating the any-hit stage (e.g. Any-Hit stage 550). For opaque geometry or when the any-hit shader is not provided opaqueness can be assumed. If the object is an AABB, the ray hit test 525 verifies the ray intersects the AABB, and the opaqueness test 526 verifies the ray intersects the programmatically defined shape within the AABB at an opaque location by evaluating the intersection shader (e.g. Intersection stage 540), if the shader is provided. When the shaders is not provided the opaqueness test 526 will fail. If the ray hit test 525 or opaqueness test 526 fails, then T&I testing 522 is performed. The current Vulkan® API specifies that for non-opaque geometry, the any-hit and intersection shaders must explicitly validate a ray-hit. If, for example, the intersection is ignored by either of these user-defined shaders, the intersection is determined to be invalid (so that the opaqueness test 526 is determined to have failed).

In some embodiments, the ray hit test 525 or the opaqueness test 526 are optional or may be omitted. For example, the opaqueness test 526, can be skipped if the object known to be opaque. This can be configured for example using one or more of Vulkan® and other graphics APIs. When the system is informed that an object is opaque, the system can assume one or more characteristics of the object, for example, a characteristic that the object does not have any holes.

When a ray hit prediction (at the feasibility test & prediction 521) cannot be made (e.g. when the feasibility test & prediction 521 fails) or when the ray hit test 525 or opaqueness test 526 fails, the prediction as a whole (e.g. feasibility test & prediction 521 as a whole) is considered to have failed. In such cases, the ray tracing operation (T&I) for the element currently being evaluated may be performed and results of the full ray tracing operation for this element be stored in memory (e.g. computer register or other nearby memory). An indication of the failed element (e.g. the element of the second set of elements for which the feasibility test & prediction 521 fails) in the result set may be also stored in memory.

In some embodiments, the feasibility test & prediction 521 and parts thereof is based on previously determined ray tracing information. Such previously determined ray tracing information typically includes information generated using conventional ray tracing operating on the first set of elements (i.e. with feasibility test & prediction disabled). In various embodiments, such previously determined ray tracing information also includes information generated using ray tracing operating on the second set of elements (i.e. with feasibility test & prediction enabled).

For feasibility testing (e.g. feasibility test at the feasibility test & prediction 521), the element (from the second set of elements) currently being evaluated and the previously determined ray tracing information may need to satisfy a certain feasibility criterion. For example, the feasibility criterion may include that ray tracing results for each member of a set of neighbor elements are available, where the set of neighbor elements is proximate to the element currently being evaluated and is located relative to element currently being evaluated according to one of a set of qualifying spatial patterns. The feasibility criterion may further include that each ray associated with each member of the set of neighbor elements intersects the same object in the ray tracing environment. As such, if rays corresponding to multiple or all neighbor elements hit the same object, the prediction (being that the ray corresponding to the element under evaluation also hits this same object) can be deemed feasible. It may be noted that a triangle, curved surface, or other primitive can be only a member of one object in the context of a prediction, although each may be understood to be an object itself in another context. (An object could be a triangle, a set of triangles on the same plane, a set of triangles that are nearly on the same plane, or a set of special curves with nearly identical & moderate curvature where they meet, etc.)

Regarding the set of qualifying spatial patterns mentioned above, the set of qualifying spatial patterns may include a single spatial pattern or a plurality of spatial patterns. Some examples of the single spatial pattern include a set of all elements neighboring the element under evaluation in any direction; a set of all elements within a specified distance of the element under evaluation in any direction; a set of all elements neighboring the element under evaluation in either one of a pair of opposing directions; and a set of all elements within a specified distance of the element under evaluation in either one of the pair of opposing directions.

The plurality of spatial patterns may be spatial patterns including different respective portions of an underlying single spatial pattern. For example, each member of the plurality of spatial patterns may a different respective portion of the single spatial pattern. To further illustrate this, suppose that the single spatial pattern is the set of all elements which border the element under evaluation (i.e. the elements to the top, bottom, left and right). Then the plurality of spatial patterns can include four spatial patterns each of which includes three elements from this single spatial pattern. That is, one of the plurality of spatial patterns can be the elements to the top, bottom and right, another can be the element so the top, bottom and left, etc.

According to embodiments, a ray hit prediction is generated based on the ray trace results of the neighboring elements (e.g. a first sparse set of elements selected in step 511 in FIG. 5). For example, if ray trace operations of all neighbor elements hit the same object in the scene, a ray hit on that object can be predicted. That is, the feasibility test can be considered satisfied and the prediction can be that the ray hits the same object that the rays of all neighboring elements hit. The ray hit test and opaqueness test can be implemented to test the prediction. This process may be implemented within the traceRay( ) method 520 following the feasibility test & prediction 521. If the prediction fails, full performance of T&I testing be initiated.

Figure 6A:
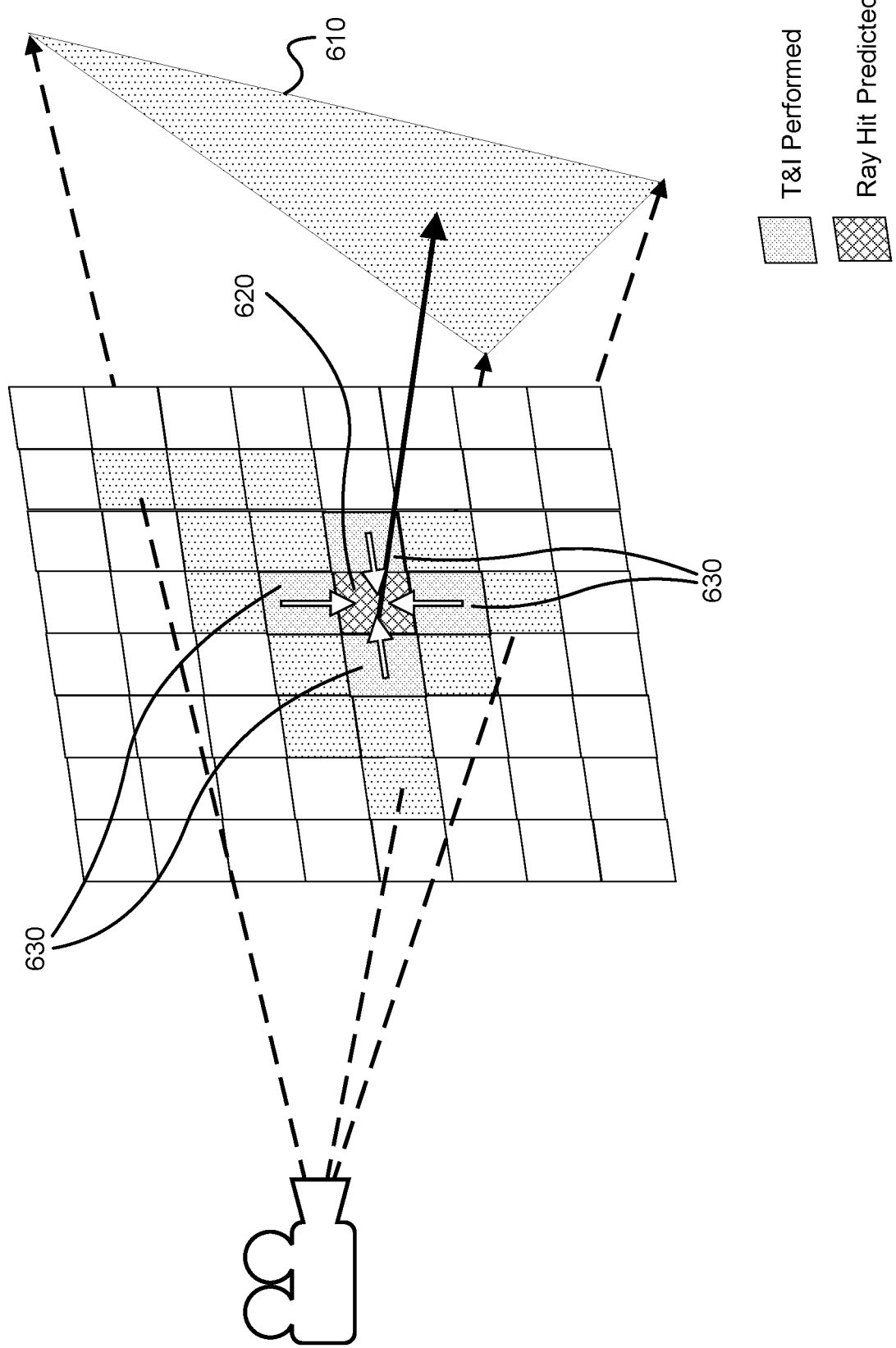
FIG. 6A illustrates a general process of mitigating redundant traversal and intersection (T&I) operations by predicting an object hit, in accordance with embodiments of the present disclosure.

FIG. 6A illustrates a general process of mitigating redundant traversal and intersection (T&I) operations by predicting a triangle hit, in accordance with embodiments of the present disclosure. The triangle 610 is hit by rays passing through four elements 630 which neighbor (surround) an element 620. The generalized ray hit prediction is that a ray passing through element 620 also hits the triangle 610. The neighbor elements 630 in this example are four adjacent elements of the element 620 in the direction of up, down, left and right. The success of the ray hit prediction may be determined by the ray hit test 525 and opaqueness test 526 by computing the intersection of the ray (passing through element 620) and the predicted triangle 610 and evaluating the opaqueness of the ray-hit (e.g. determining if the geometry is non-opaque).

The intersection information provided for example by the Vulkan® API is either completely redundant or can be efficiently computed if the triangle or AABB is provided. In the case of the triangle intersection, only gl_HitTEXT and barycentrics values change over the surface of the triangle. The costs for computation of these values are relatively low, compared to T&I, once the triangle is known. In the case of AABB intersection, only gl_HitTEXT is computed by the intersection shader. The barycentrics values are not applicable to the AABB intersections.

Figure 6B:
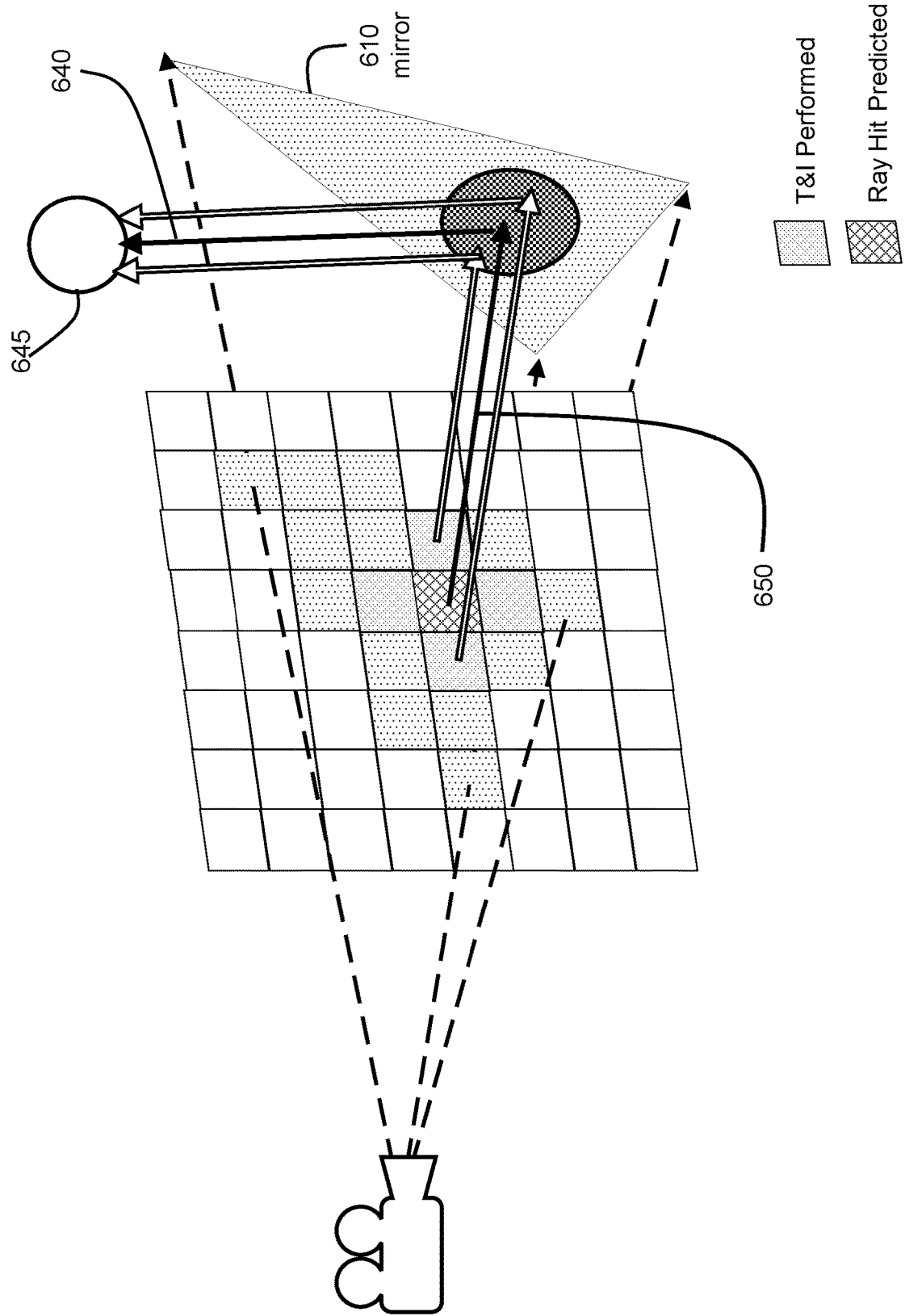
FIG. 6B illustrates an application of the process of FIG. 6B to coherent secondary rays, in accordance with embodiments of the present disclosure.

According to embodiments, the generalized ray hit prediction can be applied to not only the primary rays (e.g. rays defined from a camera point and passing through the element) but also secondary rays (e.g. rays spawned from the primary rays), as illustrated in FIG. 6B. In other words, T&I can be skipped on both the primary and secondary rays because these rays tend to be coherent (e.g. nearly parallel to secondary rays of the neighbor elements) using a ray hit prediction. Referring to FIG. 6B, provided that the triangle 610 is a mirror, T&I process for the secondary ray 640 can be skipped using the generalized ray hit prediction in the same or similar way that the ray hit prediction is applied for the primary ray 650. Accordingly, a further prediction can be made that the secondary ray 640 hits the same light source 645 as the rays which pass through the elements 630.

In various embodiments, there are other prediction methods that use the ray trace results of the neighboring elements. Such methods include a majority voting scheme, a scheme using the sequence of traceRay( ) 520 calls, a scheme using similarity evaluation between neighbor's ray information, and a scheme using the program counter(s) for computing the ray information or traceRay( ) 520 call. Therefore, for example, rather than requiring rays passing through all neighboring elements to hit the same object for prediction to be deemed feasible (and to generate the prediction), in some embodiments it is sufficient that rays passing through a sufficient number (e.g. a majority) of neighboring elements hit the same object, and the prediction can be that the ray under evaluation also hits this same object.

According to embodiments, a ray hit prediction is not generated (e.g. the feasibility test & prediction 521 fails) if the conditions in which a prediction can be made are not met (i.e. the feasibility test & prediction 521 fails). For example, if the prediction method requires (e.g. as part of a feasibility test & prediction 521) that the ray trace operations of all neighbor elements hit the same object, then a prediction cannot be made in the event that one or more of the neighbor elements hit a different object. Also, if the ray hit test 525 or opaqueness test 526 rejects the intersection, a prediction is not made (e.g. the feasibility test & prediction 521 fails). When a prediction is not made (e.g. the feasibility test & prediction 521 fails), the ray trace operation (e.g. T&I) will be performed or resumed.

Figure 7:
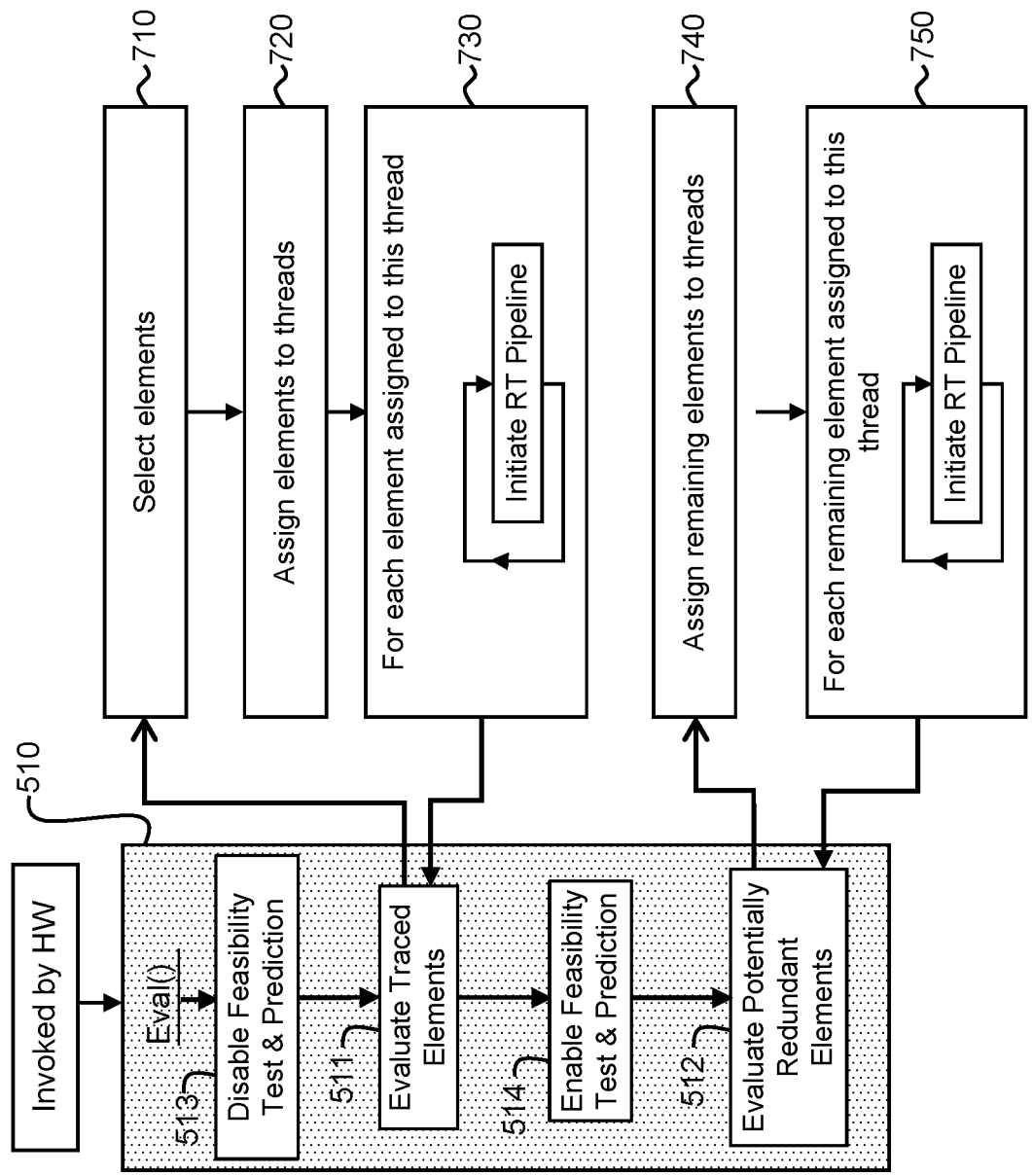
FIG. 7 illustrates an example evaluation method implemented in the MRRT process of FIG. 5, in accordance with embodiments of the present disclosure.

FIG. 7 illustrates an example evaluation method 510 implemented in the MRRT process of FIG. 5, in accordance with embodiments of the present disclosure. As illustrated in FIGS. 5 and 7, the evaluation method (i.e. eval( )) 510 includes steps 511 and 512, and the process of enabling 514 and disabling 513 of the feasibility test and prediction 521.

According to embodiments, the evaluation method 510, its associated method(s) (e.g. traceRay( ) method 520) or both may be performed by a computing device using multithreading program execution that includes a plurality of threads or warps. Each warp includes a group of threads (a plurality of threads) which execute a same set of program instructions. Some warps may include threads corresponding to a subset of the elements which are contiguous in the 2D or 3D image displayed by a 2D or 3D graphical display device (e.g. monitor, screen, hologram projector).

In various embodiments, the first set of elements and the second set of elements in the ray tracing environment are processed using threads in the same warp or different warps. The first or second sets of elements may be sparse. In various embodiments, at least some elements of the first set of elements are neighbors of at least one element of the second set of elements. In some embodiments, the first set of neighbor elements may be processed using threads of a warp and the second set of elements may be processed using threads of another warp. In some embodiments, the first set of neighbor elements may be processed using threads of a warp and the second set of elements (e.g. remaining elements) may be processed using other threads of the same warp.

Referring to FIG. 7, at step 710, a set of elements (e.g. in a first set of elements) are selected for evaluation. The set of elements may be sparse or spaced apart. Upon the selection, at step 720, the selected elements are assigned to each of the threads in the warp, which is a set of multiple threads (e.g. 16 or 32 threads). Then, at step 730, each thread loops over the elements assigned thereto. Specifically, each thread, for each of the assigned elements, initiates the ray tracing pipeline by invoking the "Ray Generate" stage (e.g. Ray Generate stage 110 in FIG. 1).

Further referring to FIG. 7, at step 740, the remaining elements (e.g. in a second set of elements) are assigned to each of the threads in the warp. Then, at step 750, each thread loops over the elements assigned thereto. Specifically, each thread, for each of the remaining elements, initiates the ray tracing pipeline by invoking the "Ray Generate" stage (e.g. Ray Generate stage 110 in FIG. 1).

As stated above, sets of elements (e.g. a sparse set of elements) are selected for evaluation during the MRRT process, for example at step 511, step 512 or both steps in FIGS. 5 and 7. There are several variations for the selection process, as further illustrated below and elsewhere in the present disclosure.

Figure 8:
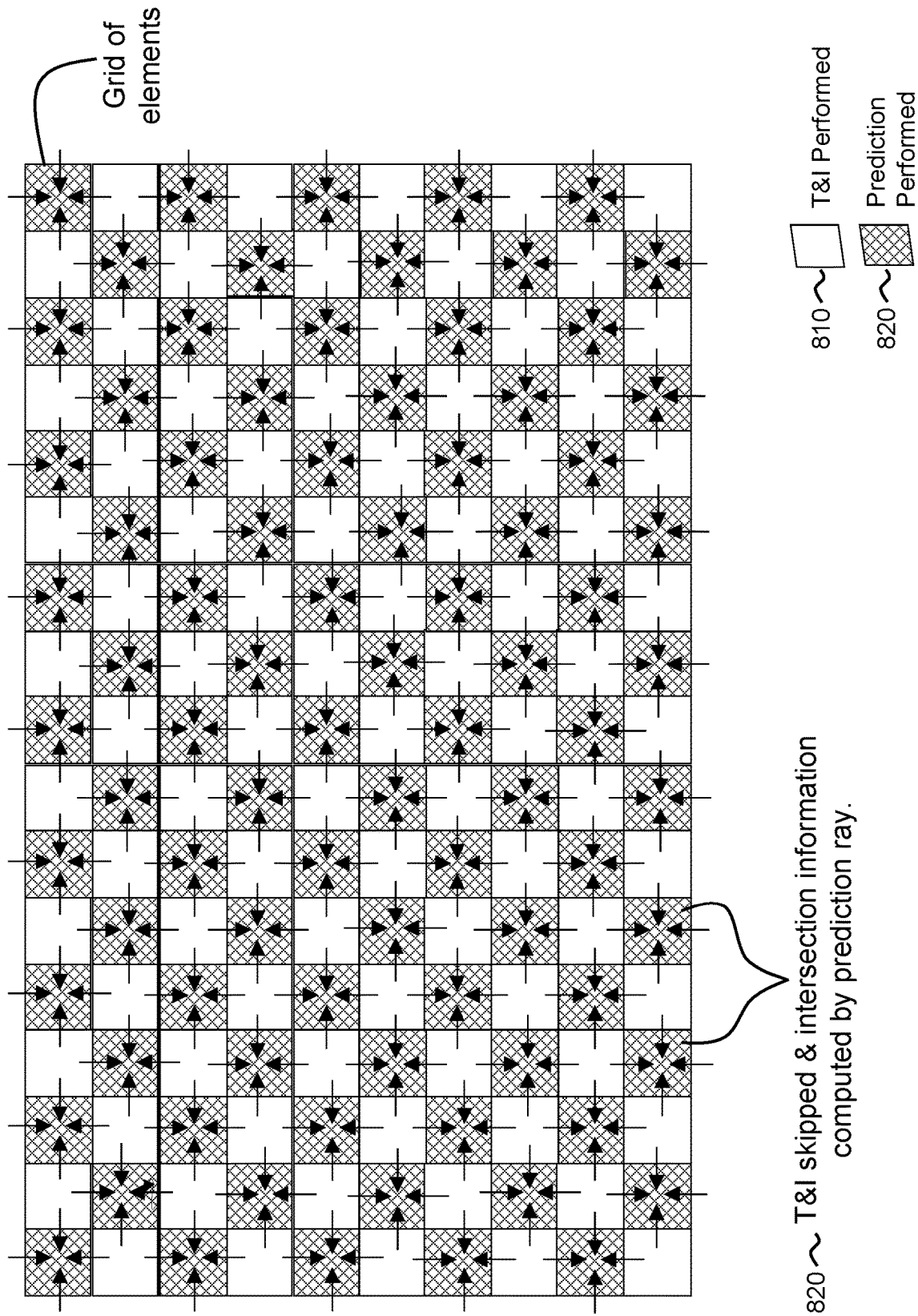
FIG. 8 illustrates selecting and assigning elements (e.g. pixels, some of which are subject to prediction) in a checkerboard fashion, in accordance with embodiments of the present disclosure.

One method for selecting elements in a first set includes selecting and assigning elements in a checkerboard fashion such that ray hit prediction is attempted for the elements belonging to some diagonal rows of a grid, with each pair of those diagonal rows being separated by one respective intervening diagonal row, as illustrated in FIG. 8. As illustrated in FIG. 8, T&I testing is skipped for every other element. T&I testing is performed on elements 810 (i.e. elements in brighter color). T&I testing is skipped and intersection information is computed by prediction ray on elements 820 (i.e. elements in darker color).

The process of eliminating redundant T&I testing described above and illustrated in FIG. 8 can be also presented as follows:

[For elements 810]
Perform full T&I testing.
Store [INTERSECTION INFO].
[For elements 820]
Load elements [INTERSECTION INFO] of all A & B neighbor elements.
If all neighbor elements intersect the same triangle or AABB:
    Then, compute gl_HitTEXT and Barycentrics as required.
Otherwise,
    Perform full T&I testing.
[INTERSECTION INFO]
Set of all used built-in values.

Figure 9:
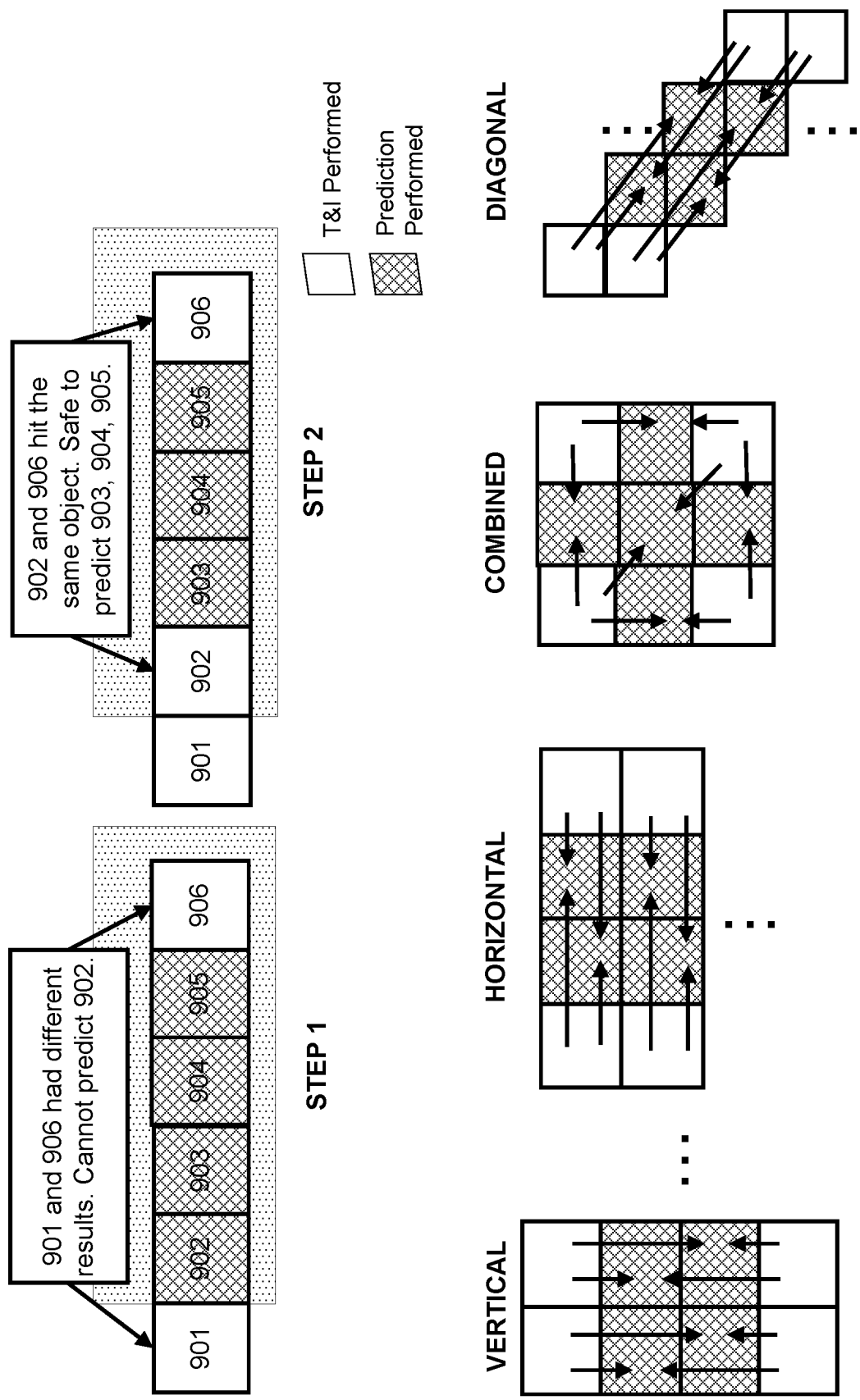
FIG. 9 illustrates evaluation of elements using a spaced-apart configuration in which multiple elements which are subject to ray tracing prediction are potentially contiguous with one another, in accordance with embodiments of the present disclosure.

In some embodiments, ray hit predictions are generated for a group of elements based on results for neighbor elements that are more than one element apart, as illustrated in FIG. 9. This is a spaced-apart or sparse configuration in which elements are more than one element apart from each other and may be referred to as a gap filling scheme. The spaced-apart configuration is beneficial as skipping ray trace operation (T&I) on more elements (e.g. pixels) can improve performance on image rendering.

Larger gaps between elements on which T&I is performed can be handled by updating the information for the feasibility test & prediction 521 after every T&I operation. In other words, the elements between the two elements on which T&I is performed can be determined using the ray hit information that is updated after each T&I operation. For example, referring to FIG. 9, T&I is first performed the elements 901 and 906. As the elements 901 and 906 do not hit the same object, it is deemed that the ray tracing result for element 902 cannot be predicted. In the next step, T&I is performed for the element 902. As the rays for elements 902 and 906 intersect the same object, as illustrated in FIG. 9, it is deemed feasible to predict the ray tracing results for elements 903, 904 and 905, as these elements are located between the elements 902 and 906. The ray tracing prediction for elements 903, 904 and 905 is that they all hit the same object as the rays for elements 902 and 906.

In some embodiments, the elements (e.g. elements 903, 904 and 905) between the elements on which the ray trace operation (T&I) is performed (e.g. elements 902 and 906) can be evaluated in a variety of ways, for example horizontally, vertically, diagonally, diamond-patterned or any combination thereof. The horizontal, vertical, combination of vertical and horizontal, and diagonal patterns are illustrated in FIG. 9.

In this spaced-apart configuration (e.g. gap filling scheme), when a ray hit feasibility test fails, it is indicated that a ray hit prediction cannot be made, and therefore the ray trace operation (T&I testing) is performed. The result of the ray trace operation is stored for the future use, for example to generate ray hit predictions for the remaining elements in the group. The result of the ray trace operation may be stored in memory (e.g. computer register or other nearby memory).

In some embodiments, elements are iteratively selected and evaluated in a coarse to fine manner using hierarchical schemes (multi-resolution hierarchical scheme). Mathematical methods such as space-filling curves can be applied to generate such coarse to fine schedules. In the case of space-filling curve scheme, a set of elements is selected to form a pattern corresponding to a subset of locations defined by a space-filling curve. The space-filling curve allows neighbor elements to be identified without searching. Instead, a space-filling curve scheme adapts to the scene geometry by progressively refining the set of elements to be subjected to T&I testing (with feasibility testing and prediction 521 disabled). Using the space-filling curve scheme, memory usage can be reduced by limiting set of active neighbor elements. Moreover, memory accesses can be reduced by allowing neighbor elements to be directly accessed and limiting the number of neighbor elements depending on scheme. Because there exist many types of space-filling curves, the best performing space-filling curve can be selected, from a set of potential space-filling curves, depending on the scene. In other words, if use of one space-filling curve results in poor performance, another space-filling curve can be selected. Thus, the first set of elements, second set of elements or both are adjusted or selected based at least partially on prior performance of the method. The performance of the method would be determined based at least partially upon the selected space filling curve.

A hierarchical scheme may begin by evaluating a set of neighbor elements (e.g. a set of sparse elements) at a low resolution, followed by attempting to predict ray hits for the remaining elements. In other words, the first set of elements is iteratively selected to form for example a pattern defined by a space-filling curve. Whenever the first set of elements is selected, the resolution of elements is increased (i.e. lower resolution to higher resolution). In one embodiment, if a feasibility test (e.g. feasibility test at the feasibility test & prediction 521) fails or indicates that a ray hit prediction cannot be made for a certain area of the element grid in the 2d or 3D image generated by a graphical display device (e.g. monitor, screen, hologram projector or other 2D or 3D graphical display devices), the evaluation may be repeated for that area of the element grid at a (e.g. incrementally) higher resolution. In one embodiment, if a predetermined number or proportion of elements fail to succeed in making a prediction, by failing the feasibility test & prediction, ray hit test or opaqueness test, for a certain region of an image, then the evaluation is repeated for that region at a (e.g. incrementally) higher resolution.

According to embodiments, each stage of the mitigating redundancy in ray tracing (MRRT) process can be implemented in computer hardware. The computer hardware includes a warp manager that assigns elements to warps for execution. The warp manager is configured to assign a first set of neighbor elements and evaluate the assigned first neighbor elements. After evaluating these neighbor elements, the warp manager in turn evaluates a second set of neighbor elements (i.e. one element at a time). The second set of neighbor elements may be the remaining elements after assigning the first set of neighbor elements. The first and/or second set of elements may be sparse. In various embodiments, at least some elements of the first set of elements are neighbors of at least one element of the second set of elements.

According to embodiments, the evaluation method (i.e. eval( )) is invoked once for each thread. Referring to FIGS. 5 and 7, step 511 is only performed if the warp is evaluating neighbor elements, and step 512 is only performed if the warp is evaluating the remaining elements. In various embodiments, memory access would be required for load and store operations. For example, if the feasibility test & prediction 521 is enabled, the memory is accessed to load the ray trace results of the neighboring elements prior to the ray trace operation (T&I testing). If feasibility test & prediction 521 is disabled, the memory is accessed upon completion of the ray hit determination step of the ray tracing pipeline.

According to embodiments, a set of neighbor elements are selected using one of available selection methods, as illustrated above. The selected neighbor elements may be a sparse set of elements. Whichever selection method is used, elements are evaluated in a deliberate order, with the neighbor elements being evaluated first. The evaluation order of the neighbor elements enables or affects a ray hit prediction that is to be made for the remaining elements. Put another way, the method for selecting a set of neighbor elements (and therefore the evaluation order) can enable the ray hit prediction and thereby significantly reduce the number of ray trace operations (T&I testing) to be performed. For example, when selecting a set of neighbor elements in a checkerboard fashion (e.g. as in FIG. 8), approximately up to half of the ray trace operations (T&I testing) can be skipped. Moreover, using a suitable method for selecting a set of neighbor elements, it may be possible to skip even more than half of the ray trace operations (T&I testing).

According to embodiments, memory operations (data reads and writes) are required when loading and storing ray trace results (results in the result set), for example during the process of generating a ray hit prediction. In various embodiments, the number of memory operations required to load and store the ray trace results is fewer than the number of memory operations required for a ray trace operation (T&I). Furthermore, it is expected that fewer calculations will be required to load and store the ray trace results compared to the required calculations for a ray trace operation (T&I) and therefore the ray hit prediction requires fewer operations and is computationally less intensive than the ray trace operation (T&I). The combined reductions in the number of memory accesses and the number of calculations may facilitate a performance improvement.

According to embodiments, the threads within a single warp will either perform full T&I testing (e.g. at step 511 in FIGS. 5 and 7) or make a ray hit prediction and potentially skip T&I testing (e.g. at step 512 in FIGS. 5 and 7). Therefore, in some embodiments, no software check is needed to determine which step of the evaluation method (e.g. step 511 or step 512 in FIGS. 5 and 7) should be executed. Similarly, in some embodiments, no software check is needed to determine if the ray hit prediction is enabled.

In some embodiments, multi-pass evaluation is executed so that excessive checks can be avoided to determine if the feasibility test & prediction 521 is enabled.

In various embodiments performing the MRRT process, a tile of elements to be evaluated is assigned to a group of threads that are executing on a graphical processing unit (GPU). A group of threads are referred to as warp or wavefront in many GPUs. Groups of threads or warps execute in a single-instruction-multiple-thread (SIMT) manner. In other words, each thread in the warp executes the same instruction at the same time.

According to embodiments, multiple elements are assigned to each thread in a warp for evaluation. Each warp can select a different scheme to evaluate the tile of elements that is assigned to it. Optimally, the number of elements in the tile is a multiple of the number of threads in the warp.

When evaluating neighbor elements using threads in a warp, first, a first set of elements is selected. The first set of elements may be a sparse set of elements. The selected elements are evaluated by the warp and the results of each ray trace operation are stored in memory (e.g. register or other nearby memory). Then, the threads in the warp communicate the ray trace results to each other, for example using subgroup operations of Vulkan® API extension. The threads that communicate the computation results and the threads that receive the computation results can be in the same warp or different warps. Subsequently, the remaining set of the elements in the tile are evaluated using the ray hit prediction where possible.

Figure 10A:
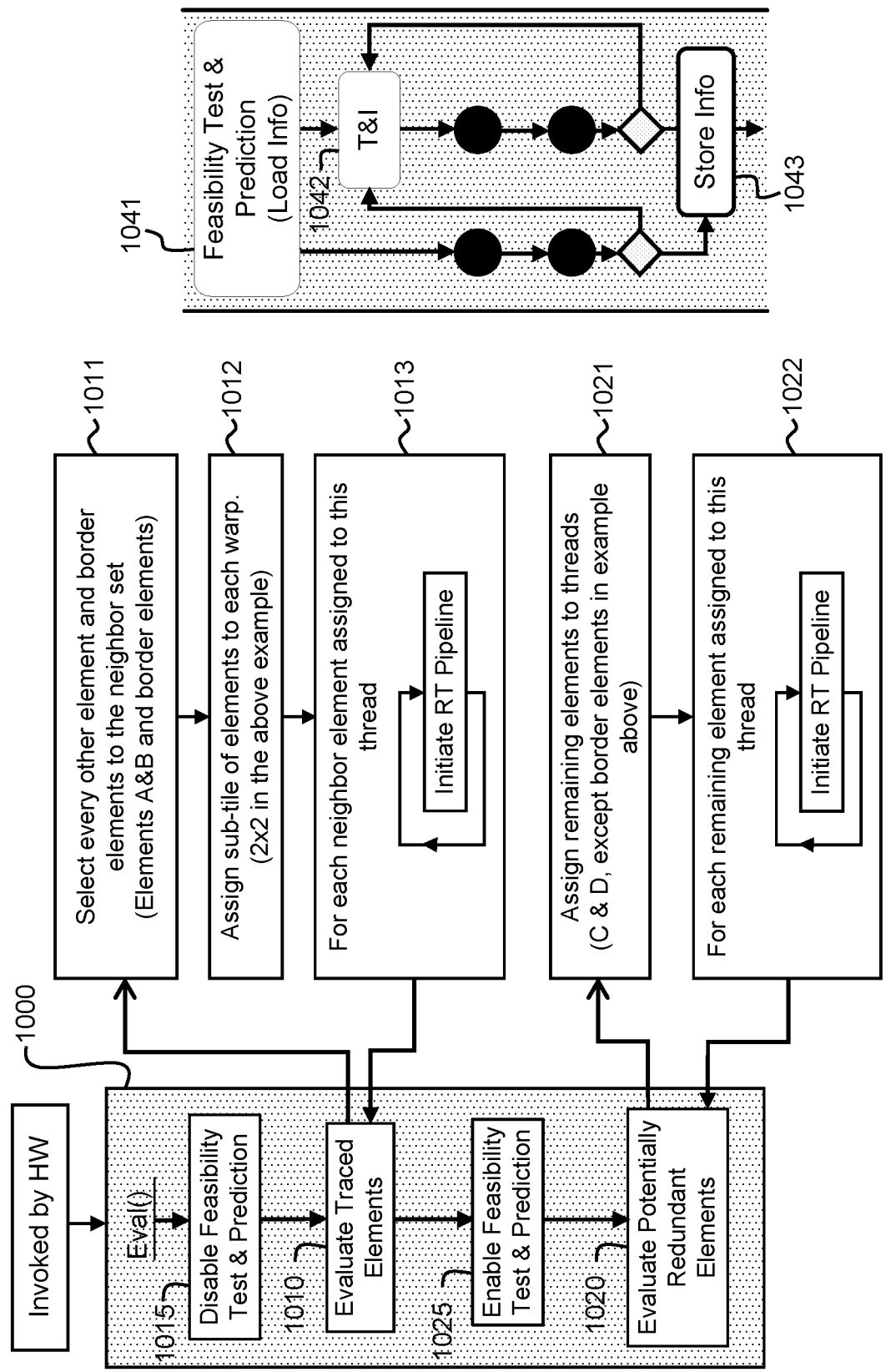
FIG. 10A illustrates an example method of evaluating a tile of neighbor elements in a checkerboard fashion using threads in a warp, in accordance with embodiments of the present disclosure.
Figure 10B:
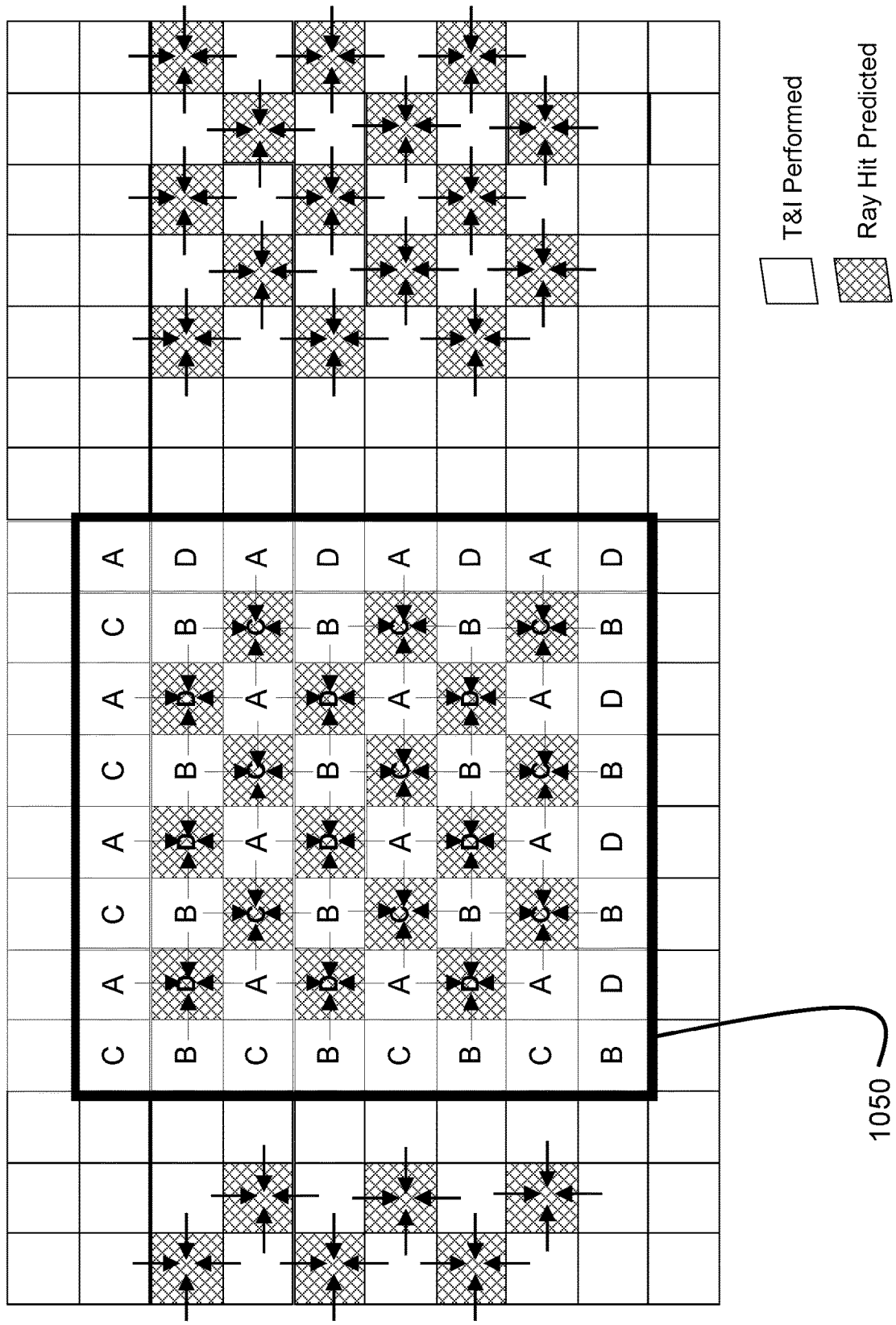
FIG. 10B illustrates the tile of neighbor elements in a checkerboard fashion that are evaluated by the method of FIG. 10A, in accordance with embodiments of the present disclosure.

FIG. 10A illustrates an example method 1000 of evaluating a tile of neighbor elements in a checkerboard fashion using threads in a warp, in accordance with embodiments of the present disclosure. FIG. 10B illustrates the tile 1050 of neighbor elements in a checkerboard fashion that are evaluated by the method 1000 of FIG. 10A, in accordance with embodiments of the present disclosure. The evaluation method 1000 corresponds to the evaluation method 510 illustrated in FIGS. 5 and 7.

Referring to FIG. 10A, the evaluation method (i.e. eval( ) 1000 is invoked on every thread in a warp. There are 16 threads in the warp used in the example of FIG. 10; however there can be more than 16 threads (e.g. 32 threads) in the warp. The evaluation method 1000 includes element evaluation steps 1010 and 1020, and the process of disabling 1015 and enabling 1025 of the feasibility test & prediction.

In step 1010, a first set of elements is evaluated. In particular, in step 1011, border elements and every other inner element (i.e. elements that are not border elements, i.e. elements A&B away from the border in FIG. 10B) are selected. The selected elements are illustrated in lighter color in FIG. 10B. Upon the selection, in step 1012, the selected elements are assigned to threads in the warp. In the case of the tile 1050 (FIG. 10B), provided that each warp computes a large tile and each thread computes a small sub-title, the 8×8 tile 1050 is evaluated by 16 threads in the warp. Specifically, the sub-tile of elements (e.g. 2×2 sub-tile) is assigned to each warp. It may be noted that use of the sub-tile may improve the performance up to 28.125%. Then, in step 1013, each thread loops over the elements assigned thereto. Specifically, each thread, for each of the assigned neighbor elements, initiates the ray tracing pipeline by invoking the "Ray Generate" stage (e.g. Ray Generate stage 110 in FIG. 1, Ray Generate stage 530 in FIG. 5). Put another way, ray trace operation (T&I testing) 1042 will be performed for the selected elements (i.e. border elements and elements A&B that are not border elements) and no prediction will occur for those elements.

In step 1020, potentially redundant elements (i.e. elements which remain unevaluated following step 1010, and which have potentially predictable ray tracing results) are evaluated. Specifically, in step 1021, the remaining elements (i.e. the shaded elements in FIG. 10B, i.e. those elements C&D which are not border elements) are assigned to each of the threads in the warp. Then, in step 1022, each thread loops over the elements assigned thereto. Specifically, each thread, for each of the remaining elements, initiates the ray tracing pipeline by invoking the "Ray Generate" stage (e.g. Ray Generate stage 110 in FIG. 1, Ray Generate stage 530 in FIG. 5). Put another way, the hit on the object is predicted for the remaining elements (i.e. the shaded elements C&D in FIG. 10B).

The "Ray Generate" stage invokes the feasibility test & prediction or the load information process 1041. The load information process 1041 is performed by exchange of values between threads using subgroup operations. Specifically, subgroupShuffle is used to move operations between threads. Consequently, a store information process 1043 (e.g. storing and loading intersection information) is not required, although the standard behavior of most compilers may spill values, if the maximum number of registers is exceeded. In some embodiments, a voting operation is provided to determine if the ray hit operation (T&I) can be skipped for element(s). When skipped, hit information would be exchanged for ray hit prediction.

According to embodiments, assignment of a tile of elements to a warp can optimize or significantly improves the performance by using for example intra-warp communication in place of memory operations as well as latency hiding. The latency hiding is beneficial particularly in association with assignment of multiple elements that will be evaluated by a thread.

According to embodiments, latency hiding can be accomplished by pausing evaluation of an element and replacing that element with another element belonging to the same thread. This prevents the thread from idling while waiting for completion of a long latency task. In various embodiments of the present disclosure, latency hiding is used to pause the execution of threads that did not make a valid ray hit prediction and thus triggered ray trace operation (T&I). While the ray trace operation (T&I) operation is being evaluated with long latency, another element can be evaluated thereby hiding the long latency of said ray trace operation.

In various embodiments, it is more practical to evaluate elements using multiple threads in a warp, and hardware support (e.g. GPU) may be required for ray trace operation(s) and evaluation of multiple elements per thread. The remaining other steps can be implemented in software through compiler transformations of the ray tracing shaders in the ray tracing pipeline. The compiler can generate the evaluation method (e.g. eval( ) 510 in FIG. 5), determine the method(s) for selecting neighbors, invoke the "Ray Generation" stage, add ray hit prediction prior to ray hit determination using intra-warp communication to retrieve the ray trace results of the neighbors. Memory operations can be used if the hardware device does not support intra-warp communication. In some embodiments, instead of subgroup operations, a special cache for ray tracing results of neighbor elements can be added to the hardware.

While graphical applications render many frames per second, images often change only a limited amount between frames. Therefore, in order to achieve higher performance, the ray-hit prediction scheme can be dynamically changed for each area of a 2D or 3D image generated by a graphical display device (e.g. monitor, screen, hologram projector or other 2D or 3D graphical display devices). For dynamically changing the ray-hit prediction scheme, in various embodiments, the actual skipping rate is compared to an upper-bound rate. The comparison of the actual skipping rate to the upper-bound is an important measure and may be referred to as the prediction rate.

In some embodiments, the ray tracing results from one frame in a sequence can be used as a basis for feasibility test & prediction in one or more other frames in the sequence which are proximate (in sequence or time) to said one frame. This can proceed in much the same manner as described above, but with elements being considered neighboring or proximate in terms of time, space, or a combination thereof. For example, if a ray associated with an element in N sequential frames (where N is some integer) hits the same object at substantially the same location, then the ray associated with that same element, or a nearby element, in the next frame can be predicted to hit the same object at substantially the same location.

In some embodiments, for improved performance, the difference between the actual skipping rate and the upper-bound may be minimized while maximizing the upper-bound. One way to achieve this is the threshold solution. If the difference between the actual skipping rate and the upper-bound is higher than a (predetermined) threshold in a certain area or region of a 2D or 3D image or graphical display, a schema using fewer neighboring elements (i.e. smaller schema) is selected and used for the ray trace prediction. This would decrease the performance upper-bound but increase the likelihood of skipping the ray trace operation (T&I). On the other hand, if the difference between the actual skipping rate and the upper-bound is lower than the (predetermined) threshold in a certain area or region of a 2D or 3D image or graphical display, a schema using more neighbor elements (i.e. larger schema) is selected and used for the ray trace prediction. This would increase the performance upper-bound but decrease the likelihood of skipping the ray trace operation (T&I).

According to embodiments, dynamic work sharing is provided. The dynamic work sharing is particularly important when each thread is responsible for a high number of rays. In some embodiments, when a ray cannot be projected (i.e. neighboring rays hit different triangles), all steps of traceRay( ) method (e.g. traceRay( ) method 160, T&I and shader executions) will be performed. In a naïve software implementation, it is possible that most rays are projected. This would result in a warp performing the traceRay( ) method with low single-instruction-multiple-data (SIMD) utilization. If projected rays and non-projected rays are mixed in a single warp, poor SIMD utilization will result during the ray trace operation (T&I). In some embodiments, there is provided a mechanism that allows an inactive thread to execute the traceRay( ) method as a proxy for another thread's ray origin, ray direction and ray payload. This mechanism would facilitate low-overhead work sharing and improve SIMD utilization.

As stated above, elements in the image plane can be evaluated in a specific order using mitigating redundancy in ray tracing (MRRT). The order of elements is determined by a method that identifies a set of elements to evaluate neighbor elements prior to another set of elements (e.g. remaining set of elements). In various embodiments, a set of elements are selected to form a spaced-apart configuration in which a majority of pairs of elements are non-adjacent; a checkerboard pattern; a vertical or horizontal pattern; a regular or irregular grid pattern of squares, diamond, hexagons or triangles; a pattern corresponding to a subset of locations defined by a space-filling (gap filling) curve; or any combination thereof. A regular grid pattern includes polygons that have equal angles and equal sides, an irregular grid pattern includes polygons that have polygons that have unequal angles and unequal sides. For example, a regular grid pattern of squares comprises a set of regular squares that are equiangular and equilateral, and an irregular grid pattern of squares may comprise irregular quadrilaterals (quadrilaterals with unequal sides), for example rectangles, trapezoids, parallelograms, kites and rhombuses. In some embodiments, elements are iteratively selected and evaluated in a coarse to fine manner using hierarchical schemes.

Following the ray hit determination step, the ray hit results (e.g. output of the ray hit determination step) are stored in memory (e.g. register or other nearby memory) for the future use by a ray hit prediction method. The ray hit prediction method uses results of the prior ray trace of the neighbor elements to make a ray hit prediction. The ray hit prediction method is distinguished from other ray hit predictors provided in the literature in that the ray hit prediction method of the present disclosure makes a ray hit prediction based on the ray tracing results of the neighbor elements (i.e. elements' neighbors). The ray hit prediction method is further distinguished from existing ray hit predictors in that MRRT process may use registers or other available memory (e.g. global memory) to store ray tracing results. In contrast, existing ray hit predictors generally generate the recent ray hit result and overwrites prior ray hits stored in a cache memory. The cache memory is not accessed to retrieve the ray hit result of the neighbor elements but to form search criteria using a ray's position and direction. Moreover, the existing ray hit predictors often require special hardware memory units and instructions.

In various embodiments performing the MRRT process, multiple elements (e.g. a tile of elements) are assigned to a group of threads that are executing on a GPU (GPU threads). The GPU threads evaluate the elements assigned thereto.

In some embodiments, the MRRT process may be implemented as a ray tracing pipeline extension (e.g. Vulkan® API extension). Such extension would direct the pipeline (e.g. Vulkan) to use any method to skip or approximate results of the ray hit operation (T&I). Said extension with the MRRT may be in place of other image rendering techniques such as super samples/resolution, spatial & temporal denoising or variable rate shading (VRS).

According to embodiments, elements can be evaluated in a deliberate order to exploit screen-space redundancy in many applications. For example, provided that redundancy in values between threads will lead to redundant computations, computation is performed only once when evaluating the elements, and the computation results are shared between threads to improve the performance. For example, some threads communicate the computation results (e.g. ray tracing results) to other threads. The threads that communicate the computation results and the threads that receive the computation results can be in the same warp or different warps. One simple method to accomplish this includes evaluating a sparse set of elements and storing the result of some internal computations. Then, the remaining set of elements is evaluated using the stored values of the computation results, and therefore the computation does not have to be repeated. Some requirements (e.g. values must match exactly) may be relaxed so that more computation results can be reused including the computation results with only negligible amount of error per pixel.

The above method can also influence ray hit prediction. Provided that prediction is in general a heuristic, many new heuristics can be used if the ray hits of the neighbor elements are known. For example, one class of heuristics can use the neighboring hit distances in order to predict the region of space in which a rat hit may occur. This approach may eliminate a significant number of candidate ray hits from consideration thereby improving performance significantly. Another class of heuristics may use an area covered by the neighboring rays in order to further constrain the candidate ray hits considered during T&I. These heuristics can be combined.

Evaluating multiple elements per thread can facilitate job scheduling that would otherwise require specialized hardware. Evaluating multiple elements per thread can facilitate a set of jobs to be scheduled by the compiler. The compiler may be associated with the warp executing the scheduled set of jobs. Such job scheduling can be accomplished by identifying a job where an element execution can be preempted for another. This may be referred to as a light-weight thread or a fiber.

Figure 11A:
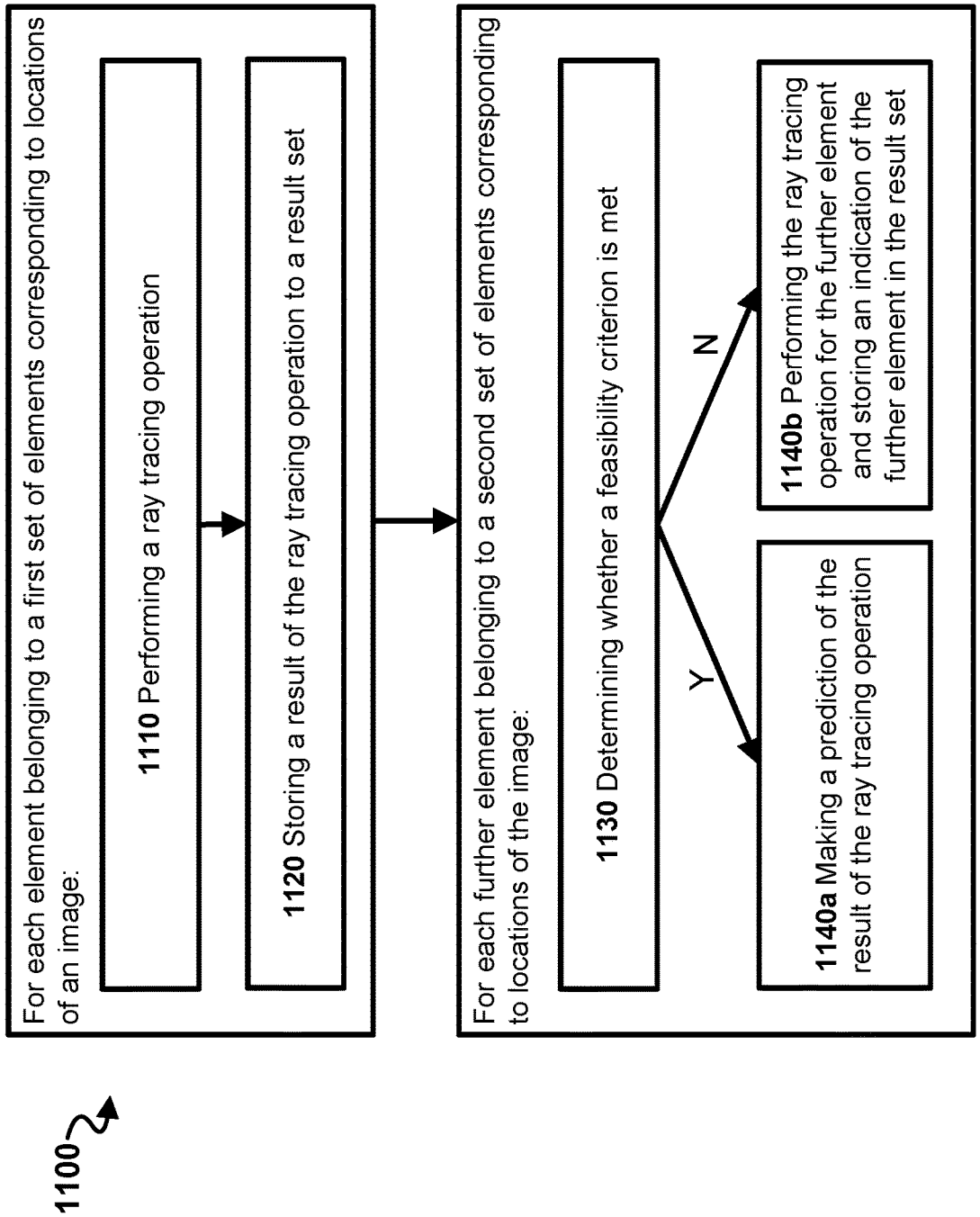
FIG. 11A illustrates a method for supporting an image rendering using ray tracing, in accordance with embodiments of the present disclosure.

FIG. 11A illustrates a method 1100 performed by a computing device, which includes a processor and a memory, for supporting an image rendering using ray tracing, in accordance with embodiments of the present disclosure. According to embodiments, the method 1100 includes, for each element belonging to a first set of elements corresponding to locations of an image, performing 1110 a ray tracing operation. The image may be an image associated with a graphical display. Said ray tracing operation includes determining whether a ray, corresponding to the element, intersects an object defined within a ray tracing environment. The method 1100 further includes, for said each element, storing 1120 a result of the ray tracing operation to a result set. The result of the ray tracing operation includes whether the ray intersects the object, and the result set indicates elements for which ray tracing information is obtained along with said ray tracing information for said elements. The method 1100 further includes, subsequently, for each further element belonging to a second set of elements corresponding to locations of the image, determining 1130 whether a feasibility criterion is met. The further element is proximate to an element currently indicated in the result set, and the second set of elements is different from the first set of elements. The feasibility criterion is indicative of whether a result of the ray tracing operation for said further element can be predicted based on ray tracing information currently stored in the result set. The method 1100 further includes, subsequently, for said each further element, when the feasibility criterion is met, making 1140a a prediction of the result of the ray tracing operation for said further element based on said ray tracing information currently stored in the result set. Said prediction is indicative of whether a further ray, corresponding to the further element, intersects the object or another object in the ray tracing environment. The method 1100 further includes, subsequently, for said each further element, when the feasibility criterion is not met, performing 1140b the ray tracing operation for the further element and storing an indication of the further element in the result set along with results of the ray tracing operation for the further element.

In some embodiments, the method further includes, when the feasibility criterion is met, storing said indication of the further element in the result set along with said prediction. Said prediction is stored as results of the ray tracing operation for the further element. When the prediction indicates the further ray intersects the object or the other object, said testing includes computing the intersection of the further ray and the object or the other object. In some cases, some or all of: said storing the result of the ray tracing operation; said storing the indication of the further element in the result set along with results of the ray tracing operation for the further element; and said storing the indication of the further element in the result set along with said prediction includes storing data in one or more computer registers.

In some embodiments, the method further includes when the feasibility criterion is met, subsequently testing the prediction to determine accuracy thereof; when said testing determines that the prediction is accurate, storing said indication of the further element in the result set along with said prediction; and when said testing determines that the prediction has failed, performing the ray tracing operation for the further element and storing said indication of the further element in the result set along with results of the ray tracing operation for the further element. When said testing determines that the prediction is accurate, said prediction is stored as results of the ray tracing operation for the further element.

In some embodiments, the method further includes when the ray intersects the object, storing a location, in the ray tracing environment, where the ray intersects the object. The method further includes when the further ray intersects the object or the other object or when the prediction indicates that the further ray intersects the object or the other object, storing a further location, in the ray tracing environment, where the further ray intersects the object or the other object. The location where the ray intersects the object and the further location where the further ray intersects the object or the other object are stored in the result set, respectively.

In some embodiments, when the further ray does not intersect any object defined within the ray tracing environment, or when the prediction indicates that the further ray does not intersect any object defined within the ray tracing environment, the method further includes storing, in the result set, an indication that the further ray does not intersect any object in the ray tracing environment. When the ray does not intersect any object defined within the ray tracing environment, the result of the ray tracing operation indicates that ray does not intersect any object defined within the ray tracing environment.

In some embodiments, storing the result of the ray tracing operation further includes storing a reference to the object. In some embodiments, said further element is proximate to said element currently indicated in the result set in that said further element neighbors said element currently indicated in the result set. In some embodiments, the feasibility criterion is evaluated based on stored results, in the result set, for elements which neighbor the further element in the image, or the prediction is based on said stored results, in the result set, for elements which neighbor the further element in the image, or both.

In some embodiments, the method further includes performing the method multiple times and adjusting the first set of elements, the second set of elements, or both based at least partially on prior performance of the method. Said performance may be determined based on one or more of: the number of the predictions determined to be accurate, the number of the first set of elements, and the number of the second set of elements. The first set of elements may be adjusted to form a pattern corresponding to a space-filling curve at a particular resolution which is based at least partially on said prior performance of the method. In some embodiments where the first set of elements is adjusted to form a pattern, the method may further include adjusting the resolution of elements in the method based at least partially on said prior performance of the method. In this case, the resolution of elements corresponds to the number of elements, or a size of elements, from which the first set of elements and the second set of elements are selected, and said prior performance of the method is determined based at least partially on said space-filling curve.

In some embodiments, the method further includes selecting the first set of elements to form one of: a spaced-apart configuration in which a majority of pairs of elements are non-adjacent; a checkerboard pattern; a regular or irregular grid pattern of squares, hexagons or triangles; and a pattern corresponding to a subset of locations defined by a space-filling curve.

In some embodiments, determining whether the feasibility criterion is met includes determining availability of results, in the result set, corresponding to the ray tracing operations for one or more other elements neighboring the further element, and determining whether each ray associated with the one or more other elements and the further ray intersect the same object in the ray tracing environment. In addition, making the prediction includes predicting that the further ray also intersects said same object in the ray tracing environment. In some cases, testing the prediction may include computing the intersection of the ray and the object, the intersection of the further ray and the object or the other object, or both.

In some embodiments, the method is performed by the computing device using multithreading program execution comprising a plurality of threads and two or more warps. Each warp consists of multiple ones of the threads which execute a same set of program instructions. Also, elements belonging to the first set of elements are processed using threads of a first one of the warps, and elements belonging to the second set of elements are processed using threads of a second one of the warps. In some cases, at least some members of the plurality of threads may communicate the ray tracing information to at least some other members of the plurality of threads.

In some embodiments, the method is performed by the computing device using multithreading program execution comprising a plurality of threads and one or more warps. Each warp consists of multiple ones of the threads which execute a same set of program instructions. Also, elements belonging to the first set of elements are processed using a first set of threads of one of the warps, and elements belonging to the second set of elements are processed using a second set of threads of said one of the warps. In some cases, at least some members of the plurality of threads may communicate the ray tracing information to at least some other members of the plurality of threads. In some cases, said one of the warps includes threads corresponding to a subset of the elements which are contiguous in the image.

Figure 11B:
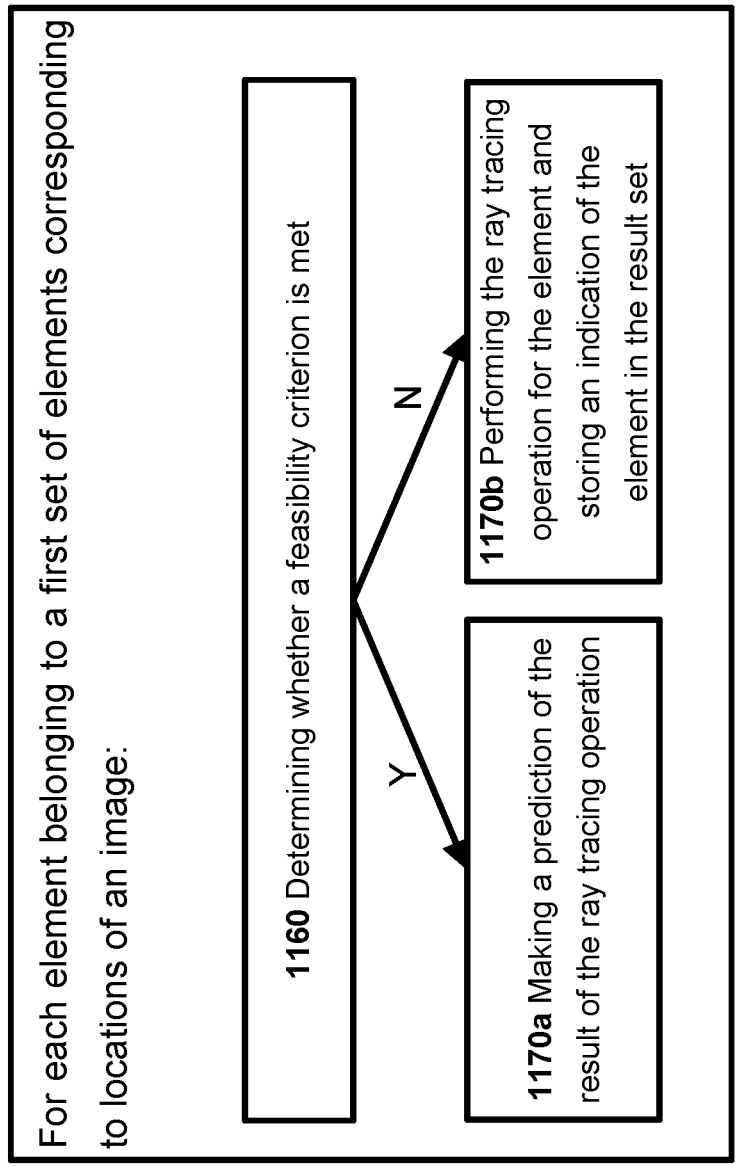
FIG. 11B illustrates another method for supporting an image rendering using ray tracing, in accordance with embodiments of the present disclosure.

FIG. 11B illustrates another method 1150 performed by a computing device, which includes a processor and a memory, for supporting an image rendering using ray tracing, in accordance with embodiments of the present disclosure. According to embodiments, the other method 1150 includes, for each element belonging to a set of elements corresponding to locations of an image, determining 1160 whether a feasibility criterion is met. The image may be an image associated with a graphical display. The feasibility criterion is indicative of whether a result of the ray tracing operation for said element can be predicted based on ray tracing information currently stored in a result set. The result set indicates elements for which ray tracing information is obtained along with said ray tracing information for said elements. The other method 1150 further includes, when the feasibility criterion is met (e.g. in response to the feasibility criterion being met), making 1170a a prediction of the result of the ray tracing operation for said element based on said ray tracing information currently stored in the result set. Said prediction is indicative of whether a ray, corresponding to the element, intersects an object defined within the ray tracing environment. Said ray tracing information currently stored in the result set includes one or both of: (i) results of one or more full ray tracing operations to one or more previously evaluated elements corresponding to other locations of the image, and (ii) one or more prior iterations of the method. In respect of the results of one or more full ray tracing operations, each full ray tracing operation includes determining whether another ray, corresponding to a respective one of the previously evaluated elements, intersects the object or another object defined within the ray tracing environment. Also, each of said results of one or more full ray tracing operations includes whether the other ray intersects the object or the other object. The other method 1150 further includes, when the feasibility criterion is not met (e.g. in response to the feasibility criterion not being met), performing 1170b the ray tracing operation for the element and storing an indication of the element in the result set along with results of the ray tracing operation for the element.

Figure 12:
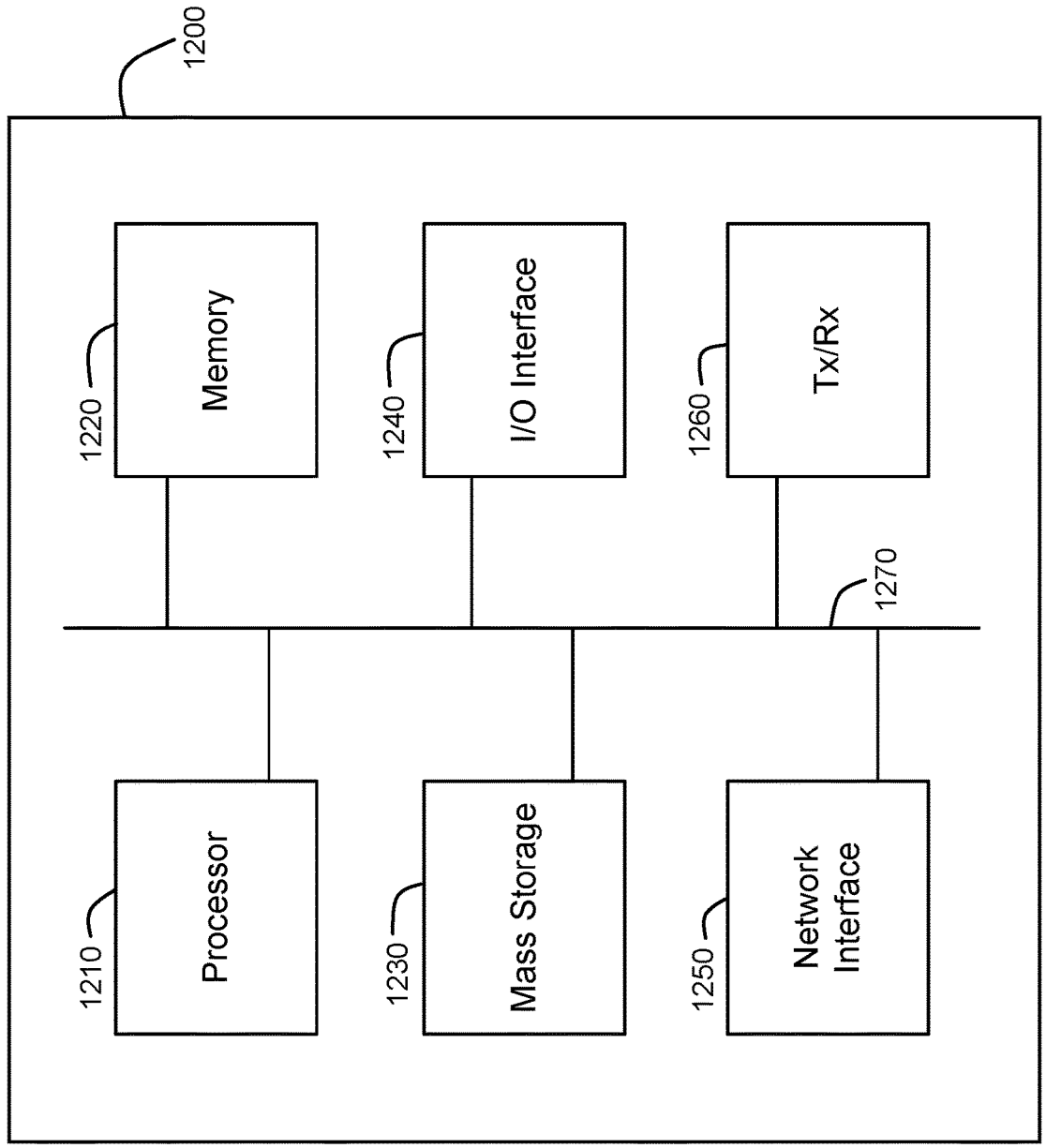
FIG. 12 is a schematic diagram of an electronic device, according to embodiments of the present disclosure.

FIG. 12 is a schematic diagram of an electronic device 1200 that may perform any or all of the steps of the above methods and features described herein, according to different embodiments of the present disclosure. For example, end-user computers, smartphones, IoT devices, laptops, tablet personal computers, electronic book readers, gaming machine, media players, devices performing tasks in relation to generation of 2D or 3D images, physical machines or servers, or other computing devices can be configured as the electronic device.

As shown, the device includes a processor 1210, such as a Central Processing Unit (CPU) or specialized processors such as a Graphics Processing Unit (GPU) or other such processor unit, memory 1220, non-transitory mass storage 1230, I/O interface 1240, network interface 1250, and a transceiver 1260, all of which are communicatively coupled via bi-directional bus 1270. According to certain embodiments, any or all of the depicted elements may be utilized, or only a subset of the elements. Further, the device 1200 may contain multiple instances of certain elements, such as multiple processors, memories, or transceivers. Also, elements of the hardware device may be directly coupled to other elements without the bi-directional bus.

The memory 1220 may include any type of non-transitory memory such as static random access memory (SRAM), dynamic random access memory (DRAM), synchronous DRAM (SDRAM), read-only memory (ROM), any combination of such, or the like. The mass storage element 1230 may include any type of non-transitory storage device, such as a solid state drive, hard disk drive, a magnetic disk drive, an optical disk drive, USB drive, or any computer program product configured to store data and machine executable program code. According to certain embodiments, the memory 1220 or mass storage 1230 may have recorded thereon statements and instructions executable by the processor 1210 for performing any of the aforementioned method steps described above.

It will be appreciated that, although specific embodiments of the technology have been described herein for purposes of illustration, various modifications may be made without departing from the scope of the technology. The specification and drawings are, accordingly, to be regarded simply as an illustration of the disclosure as defined by the appended claims, and are contemplated to cover any and all modifications, variations, combinations or equivalents that fall within the scope of the present disclosure. In particular, it is within the scope of the technology to provide a computer program product or program element, or a program storage or memory device such as a magnetic or optical wire, tape or disc, or the like, for storing signals readable by a machine, for controlling the operation of a computer according to the method of the technology and/or to structure some or all of its components in accordance with the system of the technology.

Acts associated with the method described herein can be implemented as coded instructions in a computer program product. In other words, the computer program product is a computer-readable medium upon which software code is recorded to execute the method when the computer program product is loaded into memory and executed on the microprocessor of the wireless communication device.

Acts associated with the method described herein can be implemented as coded instructions in plural computer program products. For example, a first portion of the method may be performed using one computing device, and a second portion of the method may be performed using another computing device, server, or the like. In this case, each computer program product is a computer-readable medium upon which software code is recorded to execute appropriate portions of the method when a computer program product is loaded into memory and executed on the microprocessor of a computing device.

Further, each step of the method may be executed on any computing device, such as a personal computer, server, PDA, or the like and pursuant to one or more, or a part of one or more, program elements, modules or objects generated from any programming language, such as C++, Java, or the like. In addition, each step, or a file or object or the like implementing each said step, may be executed by special purpose hardware or a circuit module designed for that purpose.

It is obvious that the foregoing embodiments of the disclosure are examples and can be varied in many ways. Such present or future variations are not to be regarded as a departure from the spirit and scope of the disclosure, and all such modifications as would be obvious to one skilled in the art are intended to be included within the scope of the following claims.

We claim:

1. A method performed by a computing device comprising a processor and a memory, the method comprising:
    for each element belonging to a first set of elements corresponding to locations of an image:
        performing a ray tracing operation, said ray tracing operation comprising determining whether a ray, corresponding to the element, intersects an object defined within a ray tracing environment;
        storing a result of the ray tracing operation to a result set, the result including whether the ray intersects the object, the result set indicating elements for which ray tracing information is obtained along with said ray tracing information for said elements;
    subsequently, for each further element belonging to a second set of elements corresponding to locations of the image, the further element being proximate to an element currently indicated in the result set, the second set of elements being different from the first set of elements:
        in response to a feasibility criterion being met, the feasibility criterion indicative of whether a result of the ray tracing operation for said further element can be predicted based on ray tracing information currently stored in the result set:
            making a prediction of the result of the ray tracing operation for said further element based on said ray tracing information currently stored in the result set, said prediction indicative of whether a further ray, corresponding to the further element, intersects the object or another object in the ray tracing environment.

2. The method of claim 1, further comprising: for said each further element: in response to the feasibility criterion not being met, performing the ray tracing operation for the further element and storing an indication of the further element in the result set along with results of the ray tracing operation for the further element.

3. The method of claim 1, further comprising:
    storing said indication of the further element in the result set along with said prediction, wherein said prediction is stored as results of the ray tracing operation for the further element.

4. The method of claim 1, further comprising:
    storing said indication of the further element in the result set along with said prediction in response to a determination that the prediction is accurate, wherein said prediction is stored as results of the ray tracing operation for the further element; or
    in response to a determination that the prediction has failed, performing the ray tracing operation for the further element and storing said indication of the further element in the result set along with results of the ray tracing operation for the further element.

5. The method of claim 1, further comprising:
    when the ray intersects the object, storing, in the result set, a location, in the ray tracing environment, where the ray intersects the object; and
    when the further ray intersects the object or the other object or when the prediction indicates that the further ray intersects the object or the other object, storing, in the result set, a further location, in the ray tracing environment, where the further ray intersects the object or the other object.

6. The method of claim 1, wherein the feasibility criterion is evaluated based on stored results, in the result set, for elements which neighbour the further element in the image, or wherein the prediction is based on said stored results, in the result set, for elements which neighbour the further element in the image, or both.

7. The method of claim 1, wherein determining whether the feasibility criterion is met comprises determining availability of results, in the result set, corresponding to the ray tracing operations for one or more other elements neighboring the further element, and determining whether each ray associated with the one or more other elements and the further ray intersect a same object in the ray tracing environment; and further wherein making the prediction comprises predicting that the further ray also intersects said same object in the ray tracing environment.

8. The method of claim 1, wherein the method is performed by the computing device using multithreading program execution comprising a plurality of threads and two or more warps, each warp consisting of multiple ones of the threads which execute a same set of program instructions, and further wherein elements belonging to the first set of elements are processed using threads of a first one of the warps and elements belonging to the second set of elements are processed using threads of a second one of the warps.

9. The method of claim 1, wherein the method is performed by the computing device using multithreading program execution comprising a plurality of threads and one or more warps, each warp consisting of multiple ones of the threads which execute a same set of program instructions, and further wherein elements belonging to the first set of elements are processed using a first set of threads of one of the warps and elements belonging to the second set of elements are processed using a second set of threads of said one of the warps.

10. A computing apparatus comprising a processor and a memory, the computing apparatus configured to:
for each element belonging to a first set of elements corresponding to locations of an image:
perform a ray tracing operation, said ray tracing operation comprising determining whether a ray, corresponding to the element, intersects an object defined within a ray tracing environment;
store, in the memory, a result of the ray tracing operation to a result set, the result including whether the ray intersects the object, the result set indicating elements for which ray tracing information is obtained along with said ray tracing information for said elements;
subsequently, for each further element belonging to a second set of elements corresponding to locations of the image, the further element being proximate to an element currently indicated in the result set, the second set of elements being different from the first set of elements:
in response to a feasibility criterion being met, the feasibility criterion indicative of whether a result of the ray tracing operation for said further element can be predicted based on ray tracing information currently stored in the result set:
make a prediction of the result of the ray tracing operation for said further element based on said ray tracing information currently stored in the result set, said prediction indicative of whether a further ray, corresponding to the further element, intersects the object or another object in the ray tracing environment.

11. The computing apparatus of claim 10, further configured, for said each further element: in response to the feasibility criterion not being met, to perform the ray tracing operation for the further element and store an indication of the further element in the result set along with results of the ray tracing operation for the further element.

12. The computing apparatus of claim 10, further configured to:
store said indication of the further element in the result set along with said prediction, wherein said prediction is stored as results of the ray tracing operation for the further element.

13. The computing apparatus of claim 10, further configured to:
store said indication of the further element in the result set along with said prediction in response to a determination that the prediction is accurate, wherein said prediction is stored as results of the ray tracing operation for the further element; or in response to a determination that the prediction has failed, perform the ray tracing operation for the further element and store said indication of the further element in the result set along with results of the ray tracing operation for the further element.

14. The computing apparatus of claim 10, further configured to:
when the ray intersects the object, store, in the result set, a location, in the ray tracing environment, where the ray intersects the object; and
when the further ray intersects the object or the other object or when the prediction indicates that the further ray intersects the object or the other object, store, in the result set, a further location, in the ray tracing environment, where the further ray intersects the object or the other object.

15. The computing apparatus of claim 10, wherein the feasibility criterion is evaluated based on stored results, in the result set, for elements which neighbour the further element in the image, or wherein the prediction is based on said stored results, in the result set, for elements which neighbour the further element in the image, or both.

16. The computing apparatus of claim 10, wherein determining whether the feasibility criterion is met comprises determining availability of results, in the result set, corresponding to the ray tracing operations for one or more other elements neighboring the further element, and determining whether each ray associated with the one or more other elements and the further ray intersect a same object in the ray tracing environment; and further wherein making the prediction comprises predicting that the further ray also intersects said same object in the ray tracing environment.

17. The computing apparatus of claim 10, wherein the computing apparatus implements a multithreading program execution comprising a plurality of threads and two or more warps, each warp consisting of multiple ones of the threads which execute a same set of program instructions, and further wherein elements belonging to the first set of elements are processed using threads of a first one of the warps and elements belonging to the second set of elements are processed using threads of a second one of the warps.

18. The computing apparatus of claim 10, wherein the computing apparatus implements a multithreading program execution comprising a plurality of threads and one or more warps, each warp consisting of multiple ones of the threads which execute a same set of program instructions, and further wherein elements belonging to the first set of elements are processed using a first set of threads of one of the warps and elements belonging to the second set of elements are processed using a second set of threads of said one of the warps.

19. A non-transitory computer readable medium comprising instructions, which when executed by a computing apparatus, cause the computing apparatus to carry out the method of claim 1.

20. The non-transitory computer readable medium of claim 19, which when executed by the computing apparatus, further cases the computing apparatus, for said each further element: in response to the feasibility criterion not being met, to perform the ray tracing operation for the further element and store an indication of the further element in the result set along with results of the ray tracing operation for the further element.

* * * * *